INVENTOR.
CHARLES E. LENZ

INVENTOR.
CHARLES E. LENZ

United States Patent Office 3,546,603
Patented Dec. 8, 1970

3,546,603
DUAL-RESOLUTION SIGNAL CONVERTER
Charles E. Lenz, Honolulu, Hawaii, assignor to North American Rockwell Corporation, a corporation of Delaware
Filed June 26, 1967, Ser. No. 648,722
Int. Cl. H03b *3/04*
U.S. Cl. 328—155                                   7 Claims

ABSTRACT OF THE DISCLOSURE

A device for providing variable resolution in the transmission link between the position output of a digital command source and the error-detecting element of a phase-comparison servomechanism. In proportion to the position output of the command source, the dual-resolution signal converter varies the relative phase of a command carrier either by full-cycle increments with a pulse-injection means to obtain coarse resolution or by fractional-cycle increments with a phase modulator to obtain fine resolution. In the servomechanism, the relative phase of the command carrier is compared with another relative carrier phase proportional to the actual angle of the output shaft and attached load to derive an error signal which drives the output shaft to the required position.

BACKGROUND OF THE INVENTION

Field of the invention

The present invention relates to a dual-resolution signal converter. More particularly, the invention relates to a system for converting the incremental signals generated by a digital computer or other source to represent coarse and fine variations of a position command into proportional coarse and fine variations in the relative phase of an input-command carrier. Each such change of relative phase is of predetermined absolute value and sign. All relative phases are defined in respect to a reference phase $\omega_r t$, where $\omega_r$ is a constant angular reference frequency and $t$ is elapsed time. Throughout this discussion, all angles will be expressed in radians, all times in seconds, and all potentials in volts. The carrier signal and other outputs of the invention are suitable for application to the command inputs of a positioning servomechanism of the phase-comparison type.

Description of the prior art

Many prior-art systems have been proposed for linking a digital computer or other position-command source to the error-detecting element of a positioning servomechanism of the phase-comparison type by means less effective than those provided by the present invention. Such a phase-comparison servomechanism is operative to adjust the position of an output shaft and the attached load to correspond with the instantaneous angular position required by the command source.

In typical prior-art systems, each incremental pulse from a digital computer commands a variation of specified sign and fixed absolute value in the position of the output shaft and attached load of a servomechanism. Counterclockwise motion is considered positive, clockwise motion negative. The absolute value of each such increment of variation must be quite small to permit fine adjustment of shaft position. Consequently, an obvious problem results whenever the misalignment is great between the required and actual positions of the output shaft. The digital computer must then generate a large number of incremental position-command pulses to slew the output shaft to the required position, thereby requiring the computer to be engaged and the angle of the output shaft to be incorrect for an excessive length of time.

To minimize this difficulty in prior-art systems, both the computer and the servomechanism must be capable of accommodating incremental position-command pulses at a very high rate. This problem is a fundamental limitation of prior-art systems.

The purpose of the present invention is to provide a system which eliminates the fundamental limitation of prior-art systems as just described by affording variable resolution in the transmission link between the incremental position outputs of a digital computer and the inputs of a positioning servomechanism of the phase-comparison type. The signal converter of the present invention is operative to reduce by a factor typically exceeding one hundred the pulse rate at which the digital computer is required to operate in order to slew the output shaft at a given rate without degrading the ultimate accuracy or resolution of which the servomechanism is capable. This capability permits unusually fast movement of the output shaft with neither the modification of the existing computer design nor the auxiliary equipment which would otherwise be required. This result is obtained through use of a new pulse-injection means in parallel with a novel phase-modulated input-command carrier generator.

SUMMARY OF THE INVENTION

In accordance with the present invention, a signal converter is provided which supplies as outputs all position-command signals required by a positioning servomechanism of the phase-comparison type. The signal converter varies these signals in accordance with incremental input-position pulses from a digital command source such as a computer and operates in either a fine-resolution mode or a coarse-resolution mode to provide whichever of two available conversion resolutions the computer has selected. For such operation, all reference signals required by the signal converter, positioning servomechanism, and associated equipment are generated by a suitable reference source.

Starting from a known initial position, a digital computer utilized as a command source for the present invention generates an instantaneous input-position command as a sequence of counterclockwise or positive-motion pulses and a sequence of clockwise or negative-motion pulses. Each pulse constitutes a command to move the output shaft and attached load in an appropriate direction by an amount equal to an adjustable predetermined resolution. The required total displacement of the output shaft from the initial position is then the algebraic sum of the individual displacements commanded by all incremental input-position pulses generated by the computer.

With the dual-resolution signal converter of the present invention, each counterclockwise or clockwise incremental input-position pulse from the digital computer causes the associated servomechanism to increase or decrease the angle of the output shaft and attached load by either of two preselected amounts, $2\pi/n$ or $2\pi/mn$, where the positive integer $n$ is the conversion speed of the output transducer of the servomechanism and the positive even integer $m$ is a design parameter of the signal converter. As a result, it is possible for the computer to command extensive variation of the position of the output shaft of the servomechanism in large steps while still retaining the ability to command final positioning or scanning motion in small steps. An obvious advantage over the prior art is the elimination of the necessity for a compromise between servomechanism resolution, maximum shaft speed, and computer modification for a higher command-pulse rate. No degradation of the ultimate resolution or steady-state accuracy of which the servomechanism is capable is caused by use of the dual-resolution signal converter.

To function with an associated computer and servomechanism to position a load mounted on an output shaft, the dual-resolution signal converter of the present invention transforms all counterclockwise and clockwise input-position pulses generated by the computer into a first carrier signal of relative phase proportional to the required position of the output shaft. Simultaneously, an output transducer in the servomechanism generates a second carrier signal of relative phase proportional to the actual instantaneous position of the output shaft. Both carrier signals are transmitted to an error-phase decoder within the phase-comparison servomechanism. The servomechanism then rotates the output shaft to minimize the difference between the two carrier phases and, consequently, the difference between the required and actual positions of the output shaft.

The over-all design of the present invention provides significant advantages. The dual-resolution signal converter can be employed with many phase-comparison positioning servomechanisms originally built for use with a single-resolution signal converter after only minor servomechanism modification. A result is that utilization of the dual-resolution signal converter with such presently used positioning servomechanisms requires only the addition of two gates to the servomechanism. An advantage is the consequent simplicity of retrofitting an existing phase-comparison servomechanism for dual-resolution operating or of using the same servomemechanism design for either single-resolution or dual-resolution operation, whichever is optimum for a given application. The field of application of a given servomechanism design is thus increased.

The design of the present signal converter eliminates the need for monostable logic elements in any component. Reduced susceptibility to noise, component aging, and environmental variation results. All transitions of every logical signal are synchronized by clock signals which can be crystal controlled. An obvious advantage is greater reliability in the operation of both the dual-resolution signal converter and the associated positioning servomechanism.

The basic components of the dual-resolution signal converter are two synchronizers, a conversion-resolution switch, a phase modulator, an input-command carrier generator, an input-phase gate, and a cyclic-command injector. The synchronizers are operative to correct the timing of the counterclockwise and clockwise incremental input-position signals from the computer to correspond to the requirements of the other components of the signal converter. The first synchronizer, designated the advance synchronizer, receives input-position commands from the computer to advance the relative phase of the input carrier and hence increase the angle of the output shaft. The second synchronizer, designated the retard synchronizer, receives input-position commands from the computer to retard the relative phase of the input carrier and hence decrease the angle of the output shaft. The outputs of the advance and retard synchronizers are applied to the phase modulator and cyclic-command injector. In response to resolution commands from the computer or elsewhere, the conversion-resolution switch establishes which of the two available conversion resolutions is to be used at any given time. Outputs of this switch are transmitted to both the phase modulator and the cyclic-command injector. As a result, the phase modulator is responsive to the synchronizer outputs only in the fine-resolution mode, and the cyclic-command injector is responsive only in the coarse-resolution mode. The phase modulator is operative to vary the relative phase of the input-position carrier in fine increments. The output of the phase modulator is directed to the input-command carrier generator, the principal function of which is to generate a logical input-position carrier that is the actual position-command signal for the associated phase-comparison positioning servomechanism.

The input-command carrier generator also directs additional output signals representing the instantaneous total phase of the input-command carrier to the input-phase gate. Total phase is the sum of the reference phase $\omega_r t$ and the appropriate relative phase. The input-phase gate is operative to indicate the quantized value of the total phase of the input-position carrier by the state of its output signal. The cyclic-command injector is operative to vary the relative phase of the input-position carrier in coarse increments.

Novel features of the components of the present invention provide several additional advantages. The design of the input-command carrier generator permits high operating speed with a minimum number of gates, a result achieved through the use of doublet counter stages, each composed of two flip-flops. An optimum combination of relatively fast settling and economical logic design results.

The conversion-resolution switch provides a means for selecting coarse or fine signal-converter resolution in response to a computer pulse identical to an incremtntal input-position pulse but applied to a synchronized coarse-resolution or fine-resolution input. Such coarse-resolution and fine-resolution pulses are never transmitted to the conversion-resolution switch simultaneously. The resolution switch remains in the state required by the last resolution-command pulse to be received. A useful result is that it is unnecessary for the computer to maintain a signal level indefinitely to cause either coarse or fine resolution to continue. An associated advantage is the ability of the resolution switch, along with the remainder of the signal converter, to operate from intermittent decoded serial digital commands. Thus, all commands directed to the signal converter can be transmitted on a single data conductor through the use of auxiliary multiplexing equipment.

The resolution of the servomechanism can be set automatically during alignment without a resolution command from the computer. For this purpose, an additional fine-resolution input is provided for excitation by an associated automatic alignment system. This input can override the other resolution-command inputs. A result is that alignment is always accomplished in a uniform manner automatically. An advantage is consequent simplification of the computer alignment program.

It is, therefore, an object of the present invention to provide a dual-resolution signal converter for permitting variable resolution in the transmission link between a source of a position-command signal and the error-detecting element of a positioning servomechanism.

It is a further object of the present invention to provide a signal converter in which two widely different position-command resolutions are available.

It is a still further object of the present invention to provide a dual-resolution signal converter which permits variable resolution in the transmission link between a position-command source and the error-detecting element of a positioning servomechanism while at all times maintaining the ultimate steady-state resolution accuracy of which the servomechanism is capable, even when coarse resolution is being employed.

It is another object of the present invention to provide a dual-resolution signal converter which provides output signals that can be applied to presently used single-resolution positioning servomechanisms with only minor modification of the servomechanism.

It is still another object of the present invention to provide a dual-resolution signal converter whose design eliminates monostable logic elements from all components.

Still other objects, features, and attendant advantages of the present invention will become apparent to those skilled in the art from a reading of the following detailed description of several embodiments constructed in accordance therewith, taken in conjunction with accompanying drawings wherein:

DESCRIPTION OF THE PREFERRED EMBODIMENTS

Figure 1:
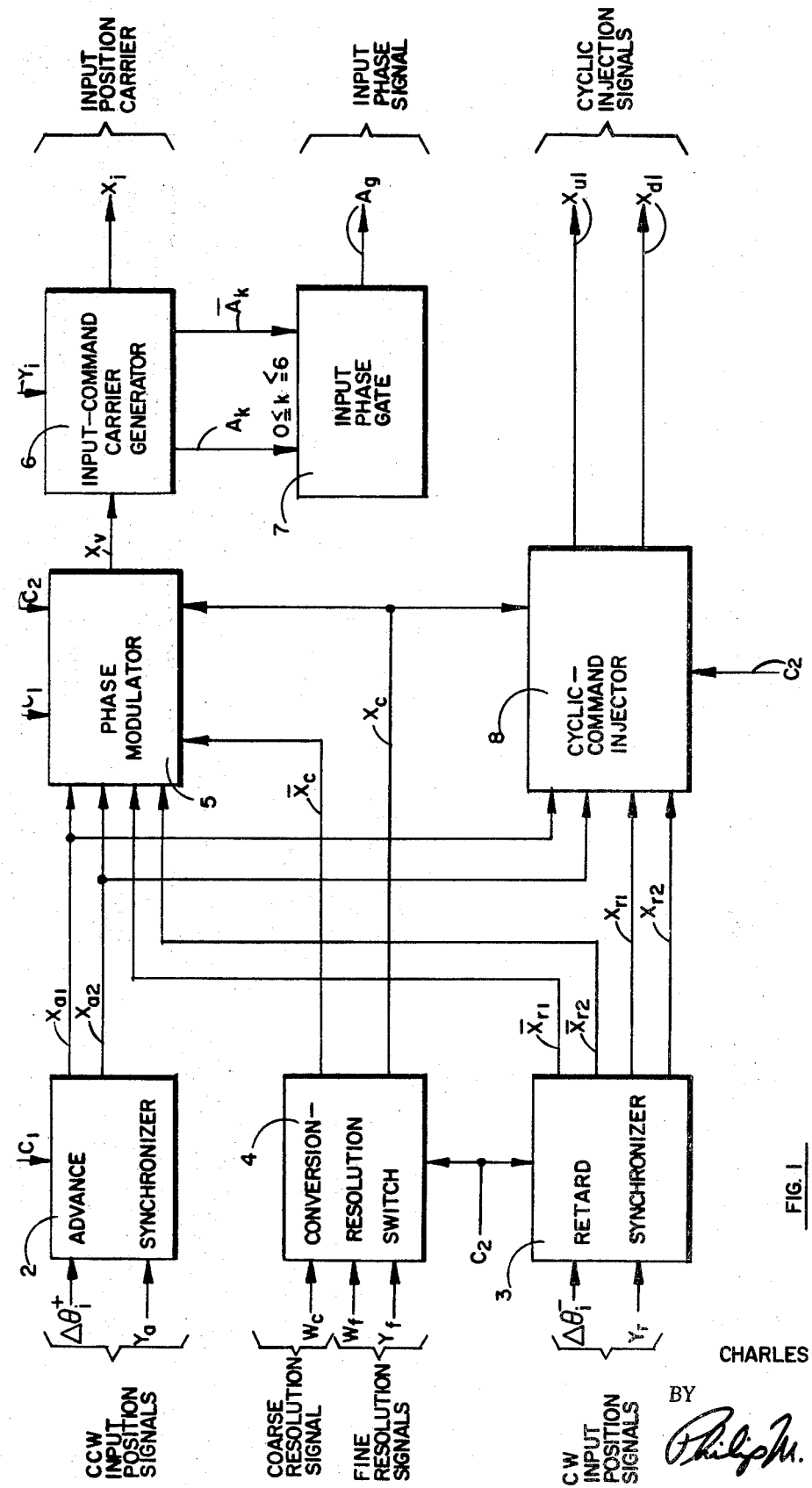
FIG. 1 is a block diagram showing the basic components of the dual-resolution signal converter.

Referring now to the drawings and, more particularly, to FIG. 1 thereof, there is shown a block diagram of the dual-resolution signal converter. The dual-resolution signal converter will be discussed first in terms of the inputs required, the outputs generated, and the functions of the basic components. Operation of the signal converter with an incremental positioning servomechanism of the phase-comparison type will thenbe described.

All transmission of information to and from the signal converter and between its internal components is by means of discrete binary voltages which can assume steady-state values only in either of two mutually exclusive intervals. Each such voltage represents a corresponding logical variable. When in one arbitrarily selected interval, a voltage is said to represent the "true" logical state denoted by the logical value 1. Conversely, when in the other interval, it is said to represent the "false" logical state denoted by the logical value 0. Both in the equations and in figures showing waveforms, the instantaneous logical values represented by discrete binary signals appear instead of the voltage levels to which these logical values correpond. Each signal input and output of the signal conveter is normally false, that is, normally represents the logical value 0.

As shown in FIG. 1, the basic components of the dual-resolution signal converter are an advance synchronizer, 2, a retard synchronizer, 3, a conversion-resolution switch, 4, a phase modulator, 5, an input-command carrier generator, 6, an input-phase gate, 7, and a cyclic command injector, 8. The dual-resolution signal converter is synchronized by periodic primary and secondary logical clock signals $C_1(t)$ and $C_2(t)$, each of period $\tau$. Both clock signals are identical except for time displacement, that is $$C_2(t) = C_1\left(t + \frac{\tau}{4}\right) \quad (1)$$

where $t$ is elapsed time. Each clock signal is normally false. The clock-pulse length, $\tau_c$, typically lies within the interval $$0 < \tau_e \leq \tau_c \leq \frac{t}{4} \quad (2)$$

where $\tau_e$ is the enabling time of the type of flip-flop to be synchronized by the clock signals. When $t > 0$, the initial $C_1(t)$ pulse is last true at $t=\tau$. Each period of a given clock signal is initiated by a 1-to-0 transition of that clock signal.

The dual-resolution signal converter obtains input-command signals from two sources: (1) a digital computer or other command source, normally emitting pulses which are not synchronized by clock signals of the signal converter, and (2) an alignment system associated with the positioning servomechanism to which signal-converter outputs are transmitted, normally emitting synchronized pulses. Each signal from the latter source is designated by the symbol Y with a specific subscript.

For proper operation, all input signals must have appropriate characteristics. In the usual mode of operation, not only are all input signals normally false, but no two input signals are ever simultaneously true. In addition, the OR function of all input signals is normally false for a specified minimum time before any input signal goes true. It is sufficient to require that the minimum length of any input pulse must be $\tau + \tau_c$ and that all inputs must remain false for at least this same interval before any input goes true, where $\tau$ and $\tau_c$ are the clock period and clock-pulse length, respectively. Although the "sufficient" restrictions just stated always asure proper operation of the signal converter, less stringent "necessary" restrictions can be applied under certain circumstances.

There are several basic inputs to the dual-resolution signal converter. The two counterclockwise input-position signals $\Delta\theta_i^+(t)$ and $Y_a(t)$ are applied to advance synchronizer 2, and the two clockwise input-position signals $\Delta\theta_i^-(t)$ and $Y_r(t)$ are applied to retard synchronizer 3. Each pulse of any of these signals is a command for one increment of motion of the output shaft of the associated positioning servomechanism in the indicated direction.

The three conversion-resolution inputs $W_c(t)$, $w_f(t)$, and $Y_f(t)$ are transmitted to conversion-resolution switch 4. The weight of each pulse of the incremental input-position signals $\Delta\theta_i^+(t)$, $\Delta\theta_i^-(t)$, $Y_a(t)$, and $Y_r(t)$ is determined by the last conversion-resolution signals to be true. If a resolution-command signal was last true by $W_c(t)$, each counterclockwise or clockwise input-position pulse requires variation of the position of the output shaft of the associated servomechanism by $2\pi/n$. However, if a resolution-command pulse was last transmitted by $W_f(t)$, or $Y_f(t)$, each counterclockwise or clockwise input-position pulse requires variation of the position of the output shaft of the associated servomechanism by $2\pi/mn$. Two conversion resolutions are thus available, the ratio of which is the even positive integer $m$.

Finally, the input-phase-set signal $Y_i(t)$ is applied to input-command carrier generator 6. This normally false signal consists of single pulses selected from the clock signal $C_2(t)$ by the alignment system. It is used during alignment to set to zero the relative phase $\phi_i(t)$ of the logical carrier $X_i(t)$ generated by the input-command carrier generator 6. At any instant the relative phase of a logical carrier signal is defined as equal to the steady-state relative phase of its fundamental sinusoidal component in relation to the total phase of a sinusoidal reference carrier of constant frequency if zero future variation of the relative phase is assumed.

The dual-resolution signal converter also has several basic outputs. One of these is the input-position carrier $X_i(t)$, which is generated by input-command carrier generator 6 as the actual position-command signal for the associated servomechanism. The relative phase $\phi_i(t)$ of this logical carrier is modulated to be proportional to the quantized value of the angular output position required. The relative phase $\phi_i(t)$ can be varied in increments of $2\pi/m$ to command fine changes in the output position of the associated servomechanism.

An additional output of the dual-resolution signal converter is the input-phase $A_g(t)$ derived from input-phase gate 7. This normally false signal goes true for an interval of approximate duration $\tau$ during each cycle of $X_i(t)$. When true, $A_g(t)$ indicates that the total phase of $X_i(t)$ is within one of a set of predetermined intervals, each of length $2\pi/m$, where the lower bounds of successive intervals differ by $2\pi$. This signal can be used by the computer in testing to determine if the signal converter has responded properly to the input-phase-set signal $Y_i(t)$ or if the signal converter is properly responsive to other input commands. In addition, it can be used to synchronize any systems which may be associated with the duel-resolution signal converter.

The remaining outputs of the dual-resolution signal converter are the cyclic-injection signals $X_{u1}(t)$ and $X_{d1}(t)$ generated by the cyclic-command injector 8. When the dual-resolution signal converter is operating in the coarse-resolution mode, each pulse transmitted by $\Delta\theta_i^+(t)$ or $\Delta\theta_i^-(t)$ causes a single pulse of $C_2(t)$ to be emitted by $X_{u1}(t)$ or $X_{d1}(t)$, respectively. Each pulse of $X_{u1}(t)$ or $X_{d1}(t)$ causes the effective phase of $X_i(t)$ to be advanced or retarded by $2\pi$. A slewing speed $m$ times as great as would otherwise be obtained then results in response to a given input-position pulse rate.

The general operation of each component of the dual-resolution signal converter will be discussed next. When all command inputs remain false, the signal converter is in the quiescent state. Operation is then the same regardless of the resolution mode. Referring to FIG. 1, the phase modulator 5 connects the signal $C_1(t)$ directly to the output $X_v(t)$. The signal $X_v(t)$ is transmitted to a high-speed binary counter in input-command carrier generator 6. This counter has $q$ stages and $2^q$ states where $2^q=m$, the design parameter to which reference was previously made. The output of input-command carrier generator 6 is derived from the most significant stage of this counter. Thus, after $X_i(t)$ changes state in response to $X_v(t)$ pulses, it will change state again every time $m/2$ additional $X_v(t)$ pulses occur. A logical square wave of period $m\tau$ results, where $\tau$ is the clock period. Signals indicating the state of each stage in input-command carrier generator 6 are applied to input-phase gate 7. The input-phase signal $A_g(t)$, which is derived from the output of input-phase gate 7, goes true for an interval of approximate duration $\tau$ once during each cycle of $X_i(t)$ at a time determined by the setting of input-phase gate 7.

When the command inputs vary, the signal converter is in the active state. Advance synchronizer 2 has the two output signals $X_{a1}(t)$ and $X_{a2}(t)$. These output signals are applied to phase modulator 5 and cyclic-command injector 8. Retard synchronizer 3 has the four outputs $X_{r1}(t)$, $X_{r2}(t)$, $\overline{X}_{r1}(t)$, and $\overline{X}_{r2}(t)$. The first two of these output signals are applied to cyclic-command injector 8, and the others are applied to phase modulator 5. Conversion-resolution switch 4 has a pair of outputs, $X_c(t)$ and its complement $\overline{X}_c(t)$. The former signal is applied to both phase modulator 5 and cyclic-command injector 8, whereas the latter signal is applied only to phase modulator 5. Cyclic-command injector 8 provides the two normally false output signals $X_{u1}(t)$ and $X_{d1}(t)$ employed in the coarse-resolution mode.

For operation in the coarse-resolution mode, the computer first emits a $W_c(t)$ pulse in order to assure that the outputs of the conversion-resolution switch 4 will be in the states $X_c(t)=1$ and $\overline{X}_c(t)=0$. This condition makes cyclic-command injector 8 responsive to variations in the outputs of synchronizers 2 and 3 and makes phase modulator 5 unresponsive to such variations.

The outputs of synchronizers 2 and 3 normally assume the states $X_{a1}(t)=\overline{X}_{a2}(t)=X_{r1}(t)=\overline{X}_{r2}(t)=0$. To command counterclockwise rotation of the servomechanism output shaft by $2\pi/n$ in the coarse-resolution mode, the computer emits a $\Delta\theta_i^+(t)$ pulse. This pulse causes the output $X_{a1}(t)$ of advance synchronizer 2 to go true upon termination of the first $C_1(t)$ pulse ending at least $\tau_e$ after $\Delta\theta_i^+(t)$ went true, where $\tau_e$ is the enabling time of the type of flip-flop employed in the signal converter. As a result, the signal $X_{a2}(t)$, originally true, then goes false upon termination of the following $C_1(t)$ pulse. During the period when $X_{a1}(t)X_{a2}(t)=1$, the cyclic-command injector 8 emits a $C_2(t)$ pulse at $X_{u1}(t)$.

To command clockwise rotation of the servomechanism output shaft by $2\pi/n$ in the coarse-resolution mode, the computer emits a $\Delta\theta_i^-(t)$ pulse. This pulse causes output $X_{r1}(t)$ of retard synchronizer 3 to go true upon termination of the first $C_2(t)$ pulse ending at least $\tau_e$ after $\Delta\theta_i^-(t)$ went true. As a result, the signal $X_{r2}(t)$, originally true, then goes false upon termination of the following $C_2(t)$ pulse. During the period when $$X_{r1}(t)X_{r2}(t)=1$$

cyclic-command injector 8 emits a $C_2(t)$ pulse at $X_{d1}(t)$.

For operation in the fine-resolution mode, either the computer emits a $W_f(t)$ pulse or the alignment system emits a $Y_f(t)$ pulse in order to assure that the outputs of the conversion-resolution switch 4 will be in the states $X_c(t)=0$ and $\overline{X}_c(t)=1$. This condition makes phase modulator 5 responsive to variations in the outputs of synchronizers 2 and 3 and makes cyclic-command injector 8 unresponsive to such variations. In a typical application, the signal converter always operates in the fine-resolution mode during alignment but can operate in either resolution mode at other times.

To command counterclockwise rotation of the servo mechanism output shaft by $2\pi/mn$ in the fine-resolution mode, either the computer emits a $\Delta\theta_i^+(t)$ pulse or the alignment system emits a $Y_a(t)$ pulse. As previously described, a period follows between the trailing edges of consecutive $C_1(t)$ pulses during which $X_{a1}(t)X_{a2}(t)=1$. In this period, phase modulator 5 emits a $C_2(t)$ pulse, thereby advancing the total phase of $X_i(t)$ by twice the normal amount during the stated interval. The relative phase $\phi_i(t)$ of $X_i(t)$ is thus advanced by $2\pi/m$, corresponding to counterclockwise rotation of the servomechanism output shaft by $2\pi/mn$.

To command clockwise rotation of the servomechanism output shaft by $2\pi/mn$ in the fine- resolution mode, either the computer emits a $\Delta\theta_i^+(t)$ pulse or the alignment system emits a $Y_r(t)$ pulse. Consequently, a period follows between the trailing edges of consecutive $C_2(t)$ pulses during which $X_{r1}(t)X_{r2}(t)=1$. In this period, phase modulator 5 inhibits the $C_1(t)$ pulse which would normally be transmitted by $X_v(t)$, thereby preventing normal advancement of the total phase of $X_i(t)$. The relative phase $\phi_i(t)$ of $X_i(t)$ is thus retarded by $2\pi/m$, corresponding to clockwise rotation of the servomechanism output shaft by $2\pi/mn$.

Figure 2:
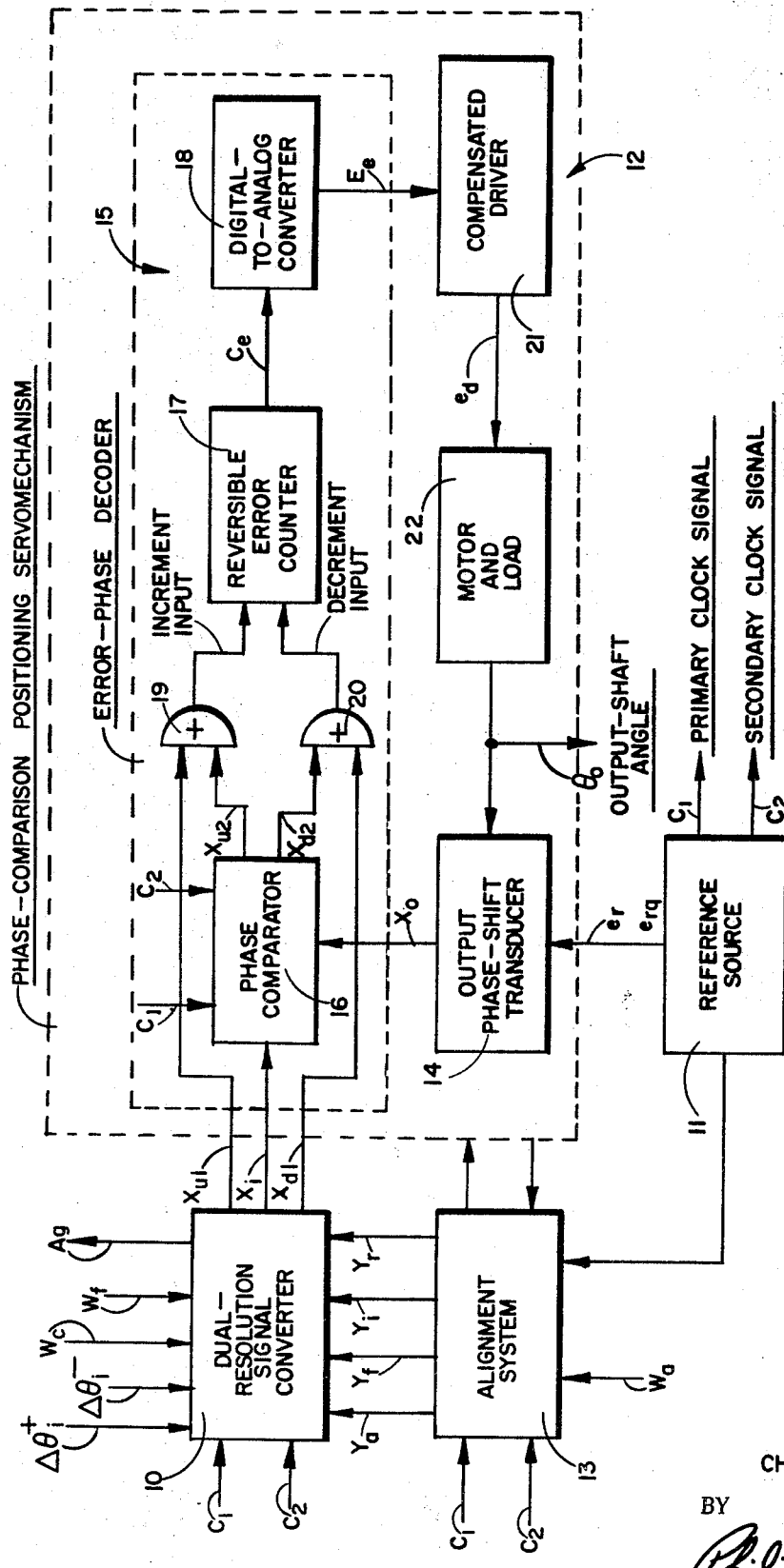
FIG. 2 is a block diagram showing the connections between the dual-resolution signal converter, the phase-comparison positioning servomechanism, the alignment system, and a reference source.

Referring now to FIG. 2, the connections are shown between dual-resolution signal converter 10, reference source 11, phase-comparison positioning servomechanism 12, and alignment system 13 for the servomechanism. All electrical communication between units, except from the reference source 11 to output phase-shift transducer 14 within servomechanism 12 and to and from compensated driver 21 within servomechanism 12, is by means of discrete binary signals.

A digital computer furnishes the incremental input-position commands $\phi\theta_i^+(t)$ and $\Delta\theta_i^-(t)$ as well as the resolution commands $W_c(t)$ and $W_f(t)$ to dual-resolution signal converter 10. The incremental input-position commands $Y_a(t)$ and $Y_r(t)$, the fine-resolution command $Y_f(t)$, and the input-phase-set signal $Y_i(t)$ are transmitted to dual-resolution signal converter 10 by alignment system 13. The signal-converter outputs $X_i(t)$, $X_{u1}(t)$, and $X_{d1}(t)$ are transmitted to positioning servomechanism 12, wile output $A_g(t)$ is transmitted to the computer or to any associated system requiring the information which it supplies regarding the total phase of the input carrier $X_i(t)$.

Reference source 11 generates the reference signals required by all units shown in FIG. 2. Included are the primary and secondary clock signals $C_1(t)$ and $C_2(t)$, already defined, which are transmitted to dual-resolution signal converter 10, to alignment system 13, and to phase comparator 16 in phase-comparison positioning servomechanism 12. In addition, reference source 11 transmits a sinusoidal reference carrier $$e_r(t) = k_1 \sin \omega_r t \qquad (3)$$

and a corresponding sinusoidal quadrature carrier $$e_{rq}(t) = k_1 \cos \omega_r t \qquad (4)$$

to servomechanism 12, where $k_1$ is a positive real constant of dimension volts, $t$ is elapsed time, and the angular reference frequency is $$\omega_r = \frac{2\pi}{m\tau} \qquad (5)$$

All relative phases are measured in respect to the total phase $\omega_r t$ of $e_r(t)$. Further information regarding reference source 11 is given in U.S. Pat. No. 3,378,692, by Charles E. Lenz entitled "Digital Reference Source."

The servomechanism shown is of the incremental phase-comparison type in which all positioning is accomplished relative to an accurately established alignment position. When line power is first applied, servomechanism 12 is directed to this alignment position by alignment system 13 in response to a computer signal $W_a(t) = 1$ transmitted to alignment system 13. Alignment is achieved by automatic variation of the signals $Y_a(t)$, $Y_i(t)$, $Y_l(t)$, and $Y_r(t)$. The signals transmitted between the alignment system and the servomechanism are not a part of the present invention and are immaterial to the current discussion.

The output of servomechanism 12 is in the form of a shaft angle, $\theta_0(t)$. Within servomechanism 12, the output shaft is connected to the output phase-shift transducer 14. Transducer 14 converts the shaft angle $\theta_0(t)$ to a shaft $\phi_0(t)$ of the phase $\omega_r t$ of the reference carrier $e_r(t)$. The signal obtained from transducer 14 is the logical output-position carrier.

$$X_o(t) = \begin{cases} 1, \sin[\omega_r t + \phi_o(t)] > 0 \text{ or } \cos[\omega_r t + \phi_o(t)] = -1 & (6a) \\ 0, \sin[\omega_r t + \phi_o(t)] < 0 \text{ or } \cos[\omega_r t + \phi_o(t)] = 1 & (6b) \end{cases}$$

where the relative output phase is $$\phi_0(t) = n\theta_0(t) \qquad (7)$$

In Relation (7), $n$ is the conversion speed of the output transducer of the servomechanism.

The input-position carrier $X_i(t)$, whose relative phase is to be compared with that of $X_0(t)$, is transmitted to servomechanism 12 by signal converter 10. The computer transforms the quantized value of the input position $\theta_i(t)$ into the incremntal signals $\Delta\theta_i^+(t)$ and $\Delta\theta_i^-(t)$ in such a manner that the logical input-position carrier resulting from subsequent conversion by dual-resolution signal converter 10 is $$X_i(t) = \begin{cases} 1, \sin[\omega_r t + \phi_i(t)] > 0 \text{ or } \cos[\omega_r t + \phi_i(t)] = -1, & (8a) \\ 0, \sin[\omega_r t + \phi_i(t)] < 0 \text{ or } \cos[\omega_r t + \phi_i(t)] = 1, & (8b) \end{cases}$$

where the relative input phase is $$\phi_i(t) = n\tilde{\theta}_i(t) \qquad (9)$$

In Relation (9), $n$ is the conversion speed of the output transducer of the servomechanism, and $\tilde{\theta}_i(t)$ is the quantized position to which the computer is directing the servomechanism output. In the interpretation of Relation (9), it must be noted that each cyclic-injection pulse of $X_{u1}(t)$ transmitted to the servomechanism upon computer command corresponds to an increase in $\theta_i(t)$ and $\tilde{\theta}_i(t)$ by $2\pi/n$, whereas each cyclic-injection pulse of $X_{d1}(t)$ corresponds to a decrease in $\theta_i(t)$ and $\tilde{\theta}_i(t)$ by the same amount.

The input-position carrier $X_i(t)$ and the output-position carrier $X_0(t)$ are both transmitted to error-phase decoder 15 in servomechanism 12. The purpose of error-phase decoder 15 is to furnish a pulse-width-modulated voltage $E_e(t)$ having an average value over a cycle which is approximately proportional to the amount by which the phase of $X_i(t)$ leads that of $X_0(t)$ at some time during the cycle. Error-phase decoder 15 consists of a phase comparator, 16, a reversible error counter, 17, a digital-to-analog converter, 18, and a pair of OR gates, 19 and 20.

Within error-phase decoder 15, the input-position carrier $X_i(t)$ and the output-position carrier $X_0(t)$ are applied to the inputs of phase comparator 16. Phase comparator 16 is operative to sense a corresponding point in every cycle of each carrier applied to it and to provide a separate output pulse indicating both the time of occurrence of each such point and the identity of the carrier with which the point is associated. Accordingly, each 0-to-1 transition of $X_i(t)$ causes phase comparator 16 to transmit a succeeding $C_1(t)$ pulse via $X_{u2}(t)$ and OR gate 19 to the increment input of reversible counter 17. Each such pulse increases by 1 the error count stored in counter 17. Similarly, each 1-to-0 transition of $X_0(t)$ causes phase comparator 16 to transmit a succeeding $C_1(t)$ pulse via $X_{d2}(t)$ and OR gate 20 to the decrement input of counter 17. Each such pulse decreases by 1 the count stored in counter 17. Phase comparator 16 is so designed that, whenever the timing of $X_i(t)$ and $X_p(t)$ is such that the same $C_1(t)$ pulse would normally be transmitted by both $X_{u2}(t)$ and $X_{d2}(t)$, both $X_{u2}(t)$ and $X_{d2}(t)$ are inhibited from transmitting the $C_1(t)$ pulse.

The cyclic injection signals $X_{u1}(t)$ and $X_{d1}(t)$ are also directed to the increment and decrement inputs, respectively, of reversible error counter 17 through OR gates 19 and 20. No interference can occur between the inputs $X_{u1}(t)$ and $X_{u2}(t)$ of OR gate 19 because $X_{u1}(t)$ consists solely of selected $C_2(t)$ pulses whereas $X_{u2}(t)$ consists solely of selected $C_1(t)$ pulses. A similar relationship exists between the inputs $X_{d1}(t)$ and $X_{d2}(t)$ of OR gate 20.

The OR gates 19 and 20 are not required when the servomechanism is used with a single-resolution signal converter. Phase-comparator outputs $X_{u2}(t)$ and $X_{d2}(t)$ can then be connected directly to the increment and decrement inputs, respectively, of reversible error counter 17. Conversely, to retrofit a servomechanism previously used with a single-resolution signal converter for dual-resolution operation, connection of OR gates 19 and 20 is the only modification necessary.

The manner in which the present invention operates in adjusting the output-shaft angle of the associated servomechanism with either coarse or fine resolution can now be described more fully. It will initially be shown that each pulse of $X_v(t)$ corresponds to a variation of $2\pi/m$ in the total phase $\omega_r t + \phi_i(t)$ of $X_i(t)$, that each pulse of $X_{u2}(t)$ or $X_{u1}(t)$ corresponds to a variation of $2\pi$ in the total phase of $X_i(t)$, and that each pulse of $X_{d1}(t)$ or $X_{d2}(t)$ corresponds to a variation of $-2\pi$ in the total phase of $X_i(t)$.

A full cycle of $X_i(t)$ represents an increase of $2\pi$ in the total phase of $X_i(t)$ and occurs for every $m$ consecutive pulses transmitted by $X_v(t)$. Because the amount by which input-command carrier generator 6 advances the total phase of $X_i(t)$ in response to each $X_v(t)$ pulse is the same, it follows that each pulse of $X_v(t)$ corresponds to a variation of $2\pi/m$ in the total phase of $X_i(t)$, as was to be shown.

Viewed from a reference point immediately after any 0-to-1 transition of $X_i(t)$, phase comparator 16 transmits a single $X_{u2}(t)$ pulse to the increment input of error counter 17 in response to each increase of $2\pi$ in the total phase of $X_i(t)$. Consequently, each pulse of $X_{u2}(t)$ corresponds to a variation of $2\pi$ in the total phase of $X_i(t)$, as was to be shown.

Every pulse applied to the increment input of reversible error counter 17 increases by 1 the count stored in counter 17. However, the error counter 17 responds identically to any appropriate pulse received at the increment input, whether such a pulse is emitted by the output $X_{u2}(t)$ of phase comparator 16 or by the output $X_{u1}(t)$ of cyclic-command injector 8. It follows that, like each pulse of $X_{u2}(t)$, each pulse of $X_{u1}(t)$ corresponds to a variation of $2\pi$ in the total phase of $X_i(t)$, as was to be shown.

Every pulse generated at the output $X_{d1}(t)$ of cyclic-command injector 8 is transmitted to the decrement input of reversible error counter 17. Each pulse applied to the decrement input of error counter 17 decreases by 1 the count stored in counter 17. Consequently, the effect upon error counter 17 of one pulse of $X_{u2}(t)$ is cancelled exactly by a single pulse of $X_{d1}(t)$. Because a pulse of $X_{u2}(t)$ corresponds to a variation of $2\pi$ in the total phase of $X_i(t)$, it follows that a pulse of $X_{d1}(t)$ corresponds to a variation of $-2\pi$ in the total phase of $X_i(t)$ as was to be shown.

Each pulse of $X_{d2}(t)$ transmitted to the decrement input of error counter 17 by phase comparator 16 in response to a 1-to-0 transition of $X_o(t)$ has the same effect upon error counter 17 as a pulse of $X_{d1}(t)$. Consequently, a pulse of $X_{d2}(t)$ and a pulse of $X_{d1}(t)$ both correspond to the same variation in the total phase of $X_i(t)$. It follows that, like each pulse of $X_{d1}(t)$, each pulse of $X_{d2}(t)$ corresponds to a variation of $-2\pi$ in the total phase of $X_i(t)$, as was to be shown.

Returning now to FIG. 2, reversible error counter 17 is typically a four-stage binary unit which stores both the 3-bit binray amplitude and the sign of a number, $C_e(t)$. The sign is represented by the most significant bit, a plus sign by a 0 and a minus sign by a 1. The magnitude of a negative number is represented in two's-complement form.

The output of reversible error counter 17 is transmitted to digital-to-analog converter 18, which is operative to convert the number $C_e(t)$ to a corresponding discrete multilevel voltage $E_e(t)$ according to the relation $$E_e(t) = k_2[C_e(t) - \tfrac{1}{2}]$$

In Relation (10), the positive real constant $k_2$ has the dimension volts. The average value of $E_e(t)$ over one cycle is approximately proportional to the instantaneous phase error $\phi_i(t) - \phi_o(t)$ at some time during that cycle. More specifically, when variation of the count $C_e(t)$ is confined to the interval 1111 to 0000 during a cycle of $E_e(t)$, it can be shown that $$\overline{E}_{ek} = \frac{k_2[\overline{\phi}_{ik} - \phi_o(\overline{t}_k)]}{2\pi - \Delta\phi_{ik}} \quad (11)$$

where a cycle is defined as beginning with an increment of $C_e(t)$, $k$ is a positive integer, $\overline{E}_{ek}$ is the average value of $E_e(t)$ over the $k$-th cycle, $\overline{\phi}_{ik}$ is the average of the initial and final values of $\phi_i(t)$ for the $k$-th cycle, $\phi_o(\overline{t}_k)$ is the value of $\phi_o(t)$ at the time $C_e(t)$ is decremented during the cycle, and $\Delta\phi_{ik}$ is the net variation of $\phi_i(t)$ during the $k$-th cycle. In particular, if the phase error $\phi_i(t) - \phi_o(t)$ remains zero throughout a cycle of $E_e(t)$ the average value of $E_e(t)$ over that cycle is also zero.

The output voltage $E_e(t)$ of digital-to-analog converter 18 is applied to the input of compensated driver 21, which performs the necessary averaging of $E_e(t)$. In addition, compensated driver 21 furnishes the compensation necessary to maintain control-loop stability, as well as the voltage gain and power gain necessary to provide the output voltage $e_d(t)$ for driving the servo motor.

Reversible error counter 17, digital-to-analog converter 18, and compensated driver 21 may be any of several standard, well-known units for performing the functions stated. More particularly, these components may comprise the error-phase decoder disclosed in U.S. Pat. No. 3,329,895, by Charles E. Lenz entitled "Digital Phase Comparator." Phase comparator 16 corresponds to digital step detector 10 of that disclosure, reversible error counter 17 corresponds to reversible step counter 20, digital-to-analog converter 18 corresponds to digital-to-analog converter 30, and compensated driver 21 may include averaging element 40.

The output of compensated driver 21 is applied to a motor and load shown at 22. The load is mounted on the output shaft with output phase-shift transducer 14. Phase-shift transducer 14 can thus convert the angle $\theta_o(t)$ of the output shaft to the corresponding relative phase $\phi_o(t)$ of the output-position carrier $X_o(t)$.

The polarity of control-loop feedback is such that any error between the relative phase $\phi_o(t)$ of the output-position carrier $X_o(t)$ and the relative phase $\phi_i(t)$ of the input-position carrier $X_i(t)$ results in a voltage $e_d(t)$ at the output of compensated driver 21 which causes motor torque to be developed in the correct direction to reduce the phase difference $\phi_i(t) - \phi_o(t)$ to approximately zero. Because $\phi_i(t)$ is proportional to the quantized value of the input position $\theta_i(t)$ and $\phi_o(t)$ is proportional to the angle $\theta_o(t)$ of the output shaft, the difference between the position $\theta_i(t)$ and the shaft angle $\theta_o(t)$ is simultaneously reduced to approximately zero.

When the dual-resolution signal converter is placed in the coarse-resolution mode, the time displacement remains the same between each 0-to-1 transition of $X_i(t)$ and the following zero crossing of $e_r(t)$ at which $\dot{e}_r(t) > 0$. As previously discussed, however, each incremental input transmitted by $\Delta\theta_i^+(t)$ or $\Delta\theta_i^-(t)$, respectively, causes a single $C_2(t)$ pulse to be transmitted via $X_{u1}(t)$ to the increment input of reversible error counter 17 or via $X_{d1}(t)$ to the decrement input of reversible counter 17. Each such $C_2(t)$ pulse advances or retards the effective value of $\phi_i(t)$ by a full $2\pi$ by simulating an additional 0-to-1 or 1-to-0 transition of either $X_i(t)$ or $X_o(t)$, respectively.

By the means just described, the weight of each incremental input pulse transmitted by $\Delta\theta_i^+(t)$ or $\Delta\theta_i^-(t)$ in the fine-resolution mode of the signal converter is multiplied by a positive even integer, $m$, in the coarse-resolution mode. Typically, the factor $m$ exceeds one hundred. It is significant, however, that the steady-state undisturbed mechanical servomechanism resolution error remains the same, approximately $$\pm \frac{\pi}{mn}$$

in both the coarse-resolution and fine-resolution converter modes. Consequently, although the introduction of coarse signal-converter resolution permits much faster slewing of the servomechanism output shaft than would be possible with fine-resolution, it does not reduce the steady-state accuracy.

The logic elements employed in the dual-resolution signal converter are JK flip-flops, AND gates, OR gates, and inverters. All of these elements communicate by means of discrete binary voltages, each of which represents a logical variable that can assume only the instantaneous values 0 and 1.

Figure 3:
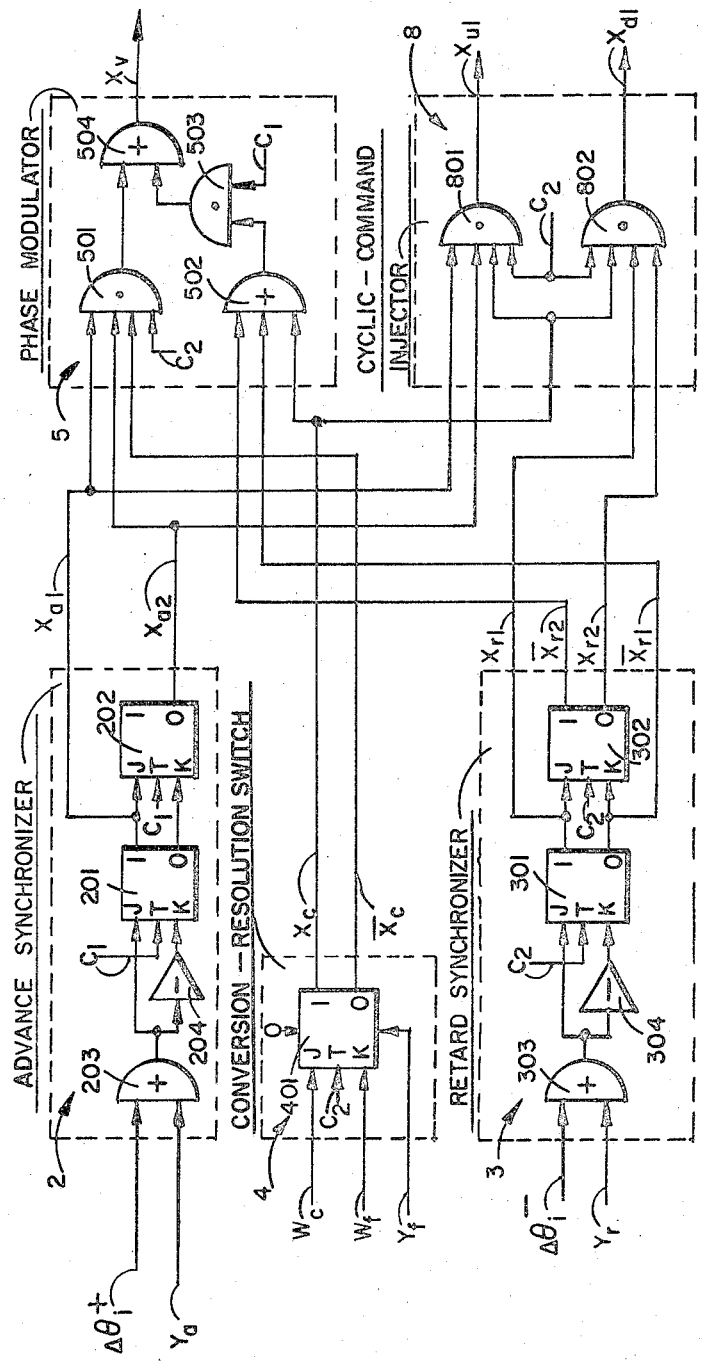
FIG. 3 is a more detailed diagram of the two synchronizers, the conversion-resolution switch, the phase modulator, and the cyclic-command injector, which are components of the dual-resolution signal converter.

Each flip-flop employed is of the JK type exemplified by flip-flop 401 in FIG. 3 (ref.: Montgomery Phister, Jr., Logical Design of Digital Computers, New York, John Wiley & Sons, Inc., 1959, pp. 128–129, 134–135). A flip-flop can assume either of two logical states. In the true (1) state, the 1 (normal) and 0 (complement) output terminals generate signals having the logical values 1 and 0, respectively. In the false (0) state, the 1 and 0 output terminals generate signals having the respective logical values 0 and 1.

An override-set input and an override-reset input, such as those shown entering the top and bottom, respectively, of the block representing flip-flop 401 in FIG. 3, can be applied to any flip-flop of the type employed. The override inputs do not affect the operation of a flip-flop when each such input has the logical value 0. System design must prevent both override inputs of a flip-flop from simultaneously assuming the logical value 1, however, because the response of the flip-flop to this condition is unpredictable. When the logical value of either override input changes to 1, a flip-flop responds immediately, regardless of the states of all other inputs. A flip-flop remains in or assumes the true state in response to a 1 signal at the override-set input and remains in or assumes the false state in response to a 1 signal at the override-reset input. If either override input does not appear in the logic diagrams of a particular flip-flop, that flip-flop responds as if the override input not shown had the logical value 0 at all times.

When both override inputs are simultaneously 0, a flip-flop operates in a mode in which it is responsive to inputs at its J, K, and T terminals. In this mode, a flip-flop can change state only immediately after a 1-to-0 transition of the trigger input applied to the T terminal. For the flip-flop to actually change state at such a time, however, appropriate logical values must have been applied to the J and K terminals continuously during the preceding interval of duration no less than $\tau_e$, where $\tau_e$ is the enabling time of the flip-flop. During this period, any one of four possible sets of logical values can be applied to the J and K terminals of the flip-flop. If a logical 0 is applied to both terminals, the flip-flop will not change state. If a logical 1 is applied to both terminals, the flip-flop will always change state. If a logical 1 and 0 are applied to the J and K terminals, respectively, the flip-flop will change to or remain in the true state. If a logical 0 and 1, respectively, are applied to the J and K terminals, the flip-flop will change to or remain in the false state.

Each gate employed is either an AND gate or an OR gate of the type described in the literature (ref.: Montgomery Phister, Jr., Logical Design of Digital Computers, supra, pp. 22–24, 32–33). The AND gates are typified by gate 501 in FIG. 3. A gate of this type produces a true output if, and only if, all inputs are simultaneously true. The OR gates are typified by gate 203 in FIG. 3. A gate of this type produces a true output if, and only if, one or more input signals are true.

The inverters employed are typified by inverter 204 in FIG. 3. Such an element produces an output which is the logical complement of its input.

Response delay is an important characteristic of any logic element. To comprehend the following discussion of the present invention, however, it is sufficient to recognize that a flip-flop requires a short time to respond to each 1-to-0 transition constituting the trailing edge of a pulse of the trigger signal at its T terminal and, therefore, changes state only after the trigger signal initiating the change is false.

Operation of the components of the dual-resolution signal converter shown in FIG. 3 will now be described in detail. FIG. 3 shows the logic diagrams of advance synchronizer 2, retard synchronizer 3, conversion-resolution switch 4, phase modulator 5, and cyclic-command injector 8. Reference will also be made to waveforms in FIG. 4 useful in explaining the operation of components appearing in FIG. 3.

The logic diagrams of advance and retard synchronizers 2 and 3 are shown in FIG. 3. Because both synchronizers are similar, only the operation of advance synchronizer 2 will be discussed in detail. Special features of retard synchronizer 3 will be described later. In typical applications, neither synchronizer requires an external signal to establish initial conditions.

The purpose of a synchronizer is to respond to each input-position pulse received with output signals which go through predetermined transitions in synchronism with trailing edges of clock pulses used as trigger signals. To assure proper response of the flip-flops in a synchronizer designed to synchronize one or more input-position signals, however, certain general restrictions must be imposed upon the signals to be synchronized. In general, for either asynchronous or synchronized input-position signals, it is sufficient to require that (1) pulses of the input-position signals transmitted to a synchronizer must be mutually exclusive, (2) once an input-position signal goes true, it must remain true during at least one complete pulse of the clock signal applied to the T terminal of the input flip-flop, and (3) once all input-position signals transmitted to a synchronizer go false, they must all remain false for at least one complete pulse of the clock signal applied to the T terminal of the input flip-flop.

The above restrictions upon input signals can be made more specific for application to advance synchronizer 2. Advance synchronizer 2 responds identically to the two normally false input-position signals $\Delta\theta_i^+(t)$ and $Y_a(t)$. In this case, it is sufficient to require that (1) $\Delta\theta_i^+(t)$ and $Y_a(t)$ must never go true simultaneously, (2) neither input-position signal can transmit a pulse shorter than $\tau + \tau_c$, and (3) each pulse of either $\Delta\theta_{i1}^+(t)$ or $Y_a(t)$ must be followed by an interval no shorter than $\tau + \tau_c$ during which the relation $\Delta\theta_i^+(t) + Y_a(t) = 0$ is satisfied, where $\tau_c$ is the length of each clock pulse applied to the T terminal of the input flip-flop.

Advance synchronizer 2 has one set of outputs, the signals $X_{a1}(t)$ and $X_{a2}(t)$. Succeeding components are responsive to the condition $X_{a1}(t)X_{a2}(t) = 1$. This condition occurs only shortly after each 0-to-1 transition of either $\Delta\theta_i^+(t)$ or $Y_a(t)$ and exists for an interval of duration $\tau$ bounded by the trailing edges of two consecutive $C_1(t)$ pulses.

In advance synchronizer 2, the input-position signals $\Delta\theta_i^+(t)$ and $Y_a(t)$ are applied to separate inputs of OR gate 203. The output of OR gate 203 is connected to the J input terminal of flip-flop 201 and to the input terminal of inverter 204. Inverter 204 applies the logical complement of its input to the K input terminal of flip-flop 201. The 1 output terminal of flip-flop 201 is connected to the J input terminal of flip-flop 202, and the 0 output terminal of flip-flop 201 is connected to the K input terminal of flip-flop 202. Both flip-flops 201 and 202 are synchronized by $C_1(t)$ pulses applied to their T input terminals. The synchronizer output signal $X_{a1}(t)$ is derived from the 1 output terminal of flip-flop 201, and the output signal $X_{a2}(t)$ is derived from the 0 output terminal of flip-flop 202.

The output of OR gate 203 is true whenever either of the input signals $\Delta\theta_i^+(t)$ or $Y_a(t)$ is true; otherwise, the output of OR gate 203 is false. The inputs of advance synchronizer 2 have been so defined that, once the output of OR gate 203 goes true, it remains true during no less than one complete pulse of $C_1(t)$. Because the output of OR gate 203 is transmitted to the J input terminal of flip-flop 201, flip-flop 201 always assumes a state identical to that of the output of OR gate 203 either upon termination of the first complete $C_1(t)$ pulse following a transition of either $\Delta\theta_i^+(t)$ or $Y_a(t)$ or, in some cases where transition of an input signal occurs during a $C_1(t)$ pulse, upon termination of that same $C_1(t)$ pulse. Whether a transition of $\Delta\theta_i^+(t)$ or $Y_a(t)$ occurs during a $C_1(t)$ pulse or between $C_1(t)$ pulses does not affect proper operation of advance synchronizer 2.

The 1 output of flip-flop 201 remains true for no less than one period of $C_1(t)$ following each 0-to-1 transition of any pulse of $\Delta\theta_i^+(t)$ or $Y_a(t)$. Throughout any period of $C_1(t)$ which begins as flip-flop 201 goes true, flip-flop 202 is in the false state, and the condition $$X_{a1}(t)X_{a2}(t) = 1$$

exists. As a result, a single $C_2(t)$ pulse is transmitted by either phase modulator 5 or cyclic-command injector 8, depending upon the state of conversion-resolution switch 4. The state of flip-flop 202 during any period of $C_1(t)$ always duplicates the state of flip-flop 201 during the preceding period of $C_1(t)$.

The inputs $\Delta\theta_i^-(t)$ and $Y_r(t)$ of retard synchronizer 3 correspond to the inputs $\Delta\theta_i^+(t)$ and $Y_a(t)$ of advance synchronizer 2. Similarly, outputs $X_{r1}(t)$ and $X_{r2}(t)$ of retard synchronizer 3 correspond to outputs $X_{a1}(t)$ and $X_{a2}(t)$ of advance synchronizer 2. The general operation of retard synchronizer 3 is identical to that of advance synchronizer 2 except for the following differences: (1) the clock signal $C_2(t)$ is used for synchronization of retard synchronizer 3, instead of the clock signal $C_1(t)$ as in the case of advance synchronizer 2, and (2) the additional set of output signals $\overline{X}_{21}(t)$ and $\overline{X}_{r2}(t)$ is necessary. In retard synchronizer 3, the output signal $\overline{X}_{r1}(t)$ is derived from the 0 output terminal of flip-flop 301, and the output signal $\overline{X}_{r2}(t)$ is derived from the 1 output terminal of flip-flop 302.

The purpose of retard synchronizer 3 is to respond to each 0-to-1 transition of $\Delta\theta_1^-(t)$ or $Y_r(t)$ either by enabling emission of a single $C_2(t)$ pulse by cyclic-command injector 8 or by inhibiting output of a single $C_1(t)$ pulse by phase modulator 5, depending upon the state of conversion-resolution switch 4. When $X_{r1}(t)$ and $X_{r2}(t)$ are in the state $X_{r1}(t)X_{r2}(t)=1$, they enable cyclic-command injector 8. When $\overline{X}_{r1}(t)$ and $\overline{X}_{r2}(t)$ are in the corresponding state $\overline{X}_{r1}(t)+\overline{X}_{r2}(t)=0$, they inhibit phase modulator 5. These states exist simultaneously for a period $\tau$ bounded by consecutive 1-to-0 transitions of $C_2(t)$ pulses following each 0-to-1 transition of $\Delta\theta_1^-(t)$ or $Y_r(t)$.

Selection of clock signals for advance and retard synchronizers 2 and 3 is a significant factor. The clock signals are chosen to provide minimum delay in transmission of the information contained in each 0-to-1 transition of an incremental input-position signal when the signal converter is in the fine-resolution mode, because the importance of dynamic accuracy is greatest in this mode. The function of advance synchronizer 2 in the fine-resolution mode is to enable emission of selected $C_2(t)$ pulses by phase modulator 5. Advance synchronizer 2 can perform this function with the least delay if flip-flop 201 is synchronized by $C_1(t)$ pulses applied to its T terminal. Similarly, the function of retard synchronizer 3 in the fine-resolution mode is to inhibit emission of selected $C_1(t)$ pulses by phase modulator 5. Retard synchronizer 3 can perform this function with minimum delay if flip-flop 301 is synchronized by $C_2(t)$ pulses applied to its T terminal. In the coarse resolution mode, both advance and retard synchronizers 2 and 3 enable emission of selected $C_2(t)$ pulses by cyclic-command injector 8. Thus, for retard synchronizer 3 to function properly in both resolution modes, its outputs must remain in the state $X_{r1}(t)X_{r2}(t)=1$ for a full clock period $\tau$. Optimum implementation to satisfy this condition requires both flip-flops 301 and 302 to be synchronized by the same clock signal, $C_2(t)$. For standardization, both flip-flops of advance synchronizer 2 are also synchronized by the same clock signal, in this case $C_1(t)$. The maximum permissible input-pulse rate established by restrictions already imposed upon the input-position signals is not affected by the time $\tau$ required by either flip-flop 202 or 302 to follow the corresponding input flip-flop.

Figure 4:
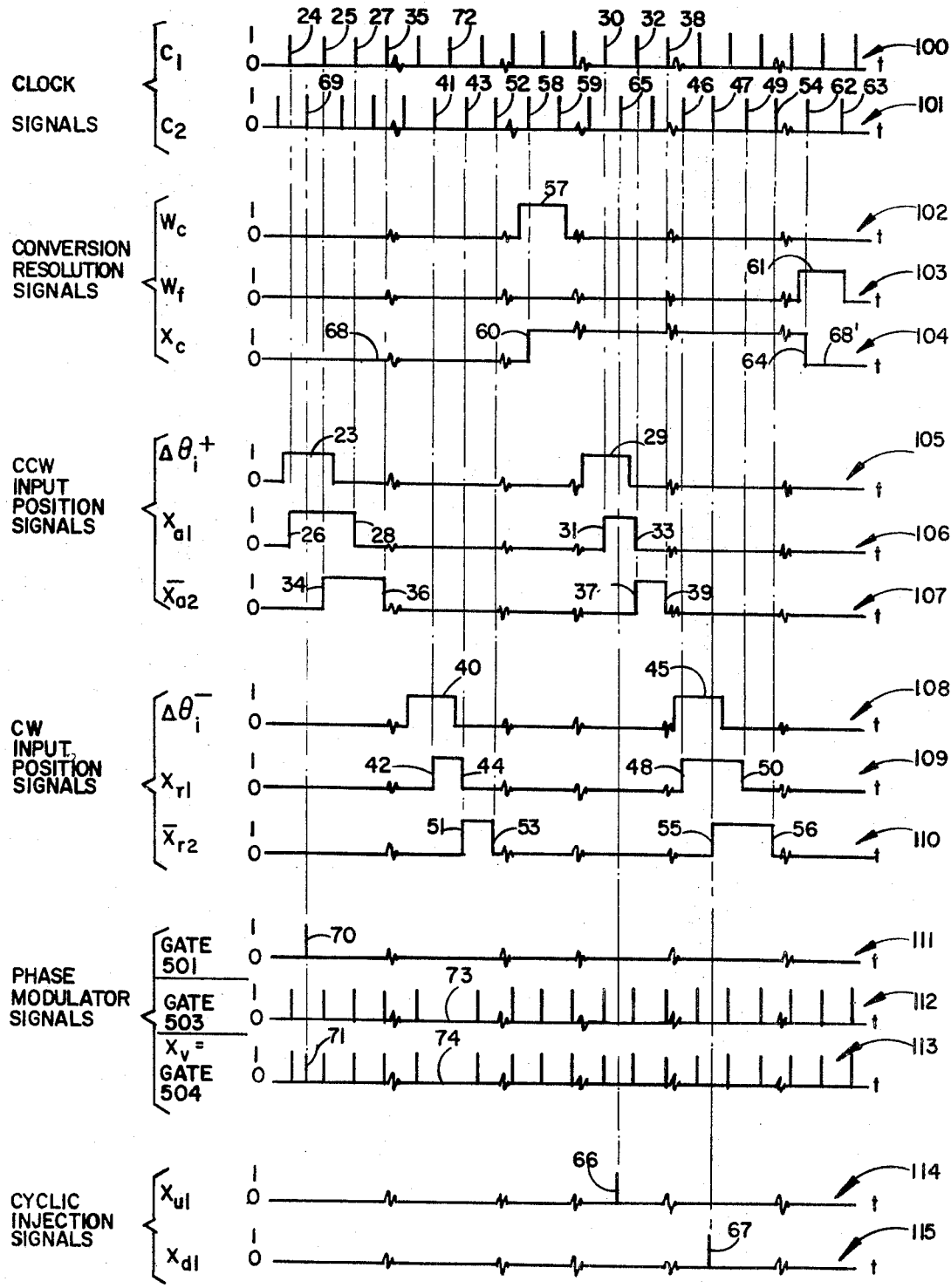
FIG. 4 shows a series of waveforms useful in explaining the operation of the two synchronizers, the conversion-resolution switch, the phase modulator, and the cyclic-command injector.

Waveforms relating to both advance and retard synchronizers 2 and 3 are shown in FIG. 4. In FIG. 4, a jagged discontinuity in a waveform indicates a time lapse during which logical transitions may or may not occur. The clock signals $C_1(t)$ and $C_2(t)$, each a pulse train of period $\tau$, are shown in waveforms 100 and 101. The first pulse of $C_1(t)$ shown is last true at time $\tau$, the first pulse of $C_2(t)$ at time $\tau/2$. These signals are shown idealized with each pulse of length $\tau_c$ approaching zero, although, as was previously stated, the clock pulse length may be as great as $\tau/4$ in practice.

A typical incremental counterclockwise input-position pulse of $\Delta\theta_1^+(t)$ having a length $5\tau/4$ is shown at 23 in waveform 105. Throughout the time interval of waveform 105, $Y_a(t)$ remains false. During the pulse of $\Delta\theta_1^+(t)$ being considered, two complete $C_1(t)$ pulses occur, at 24 and 25. No fixed relationship needs to exist between the timing of $\Delta\theta_1^+(t)$ pulses and the timing of $C_1(t)$ pulses. The states of flip-flops 201 and 202 are identical to the states of the functions $X_{a1}(t)$ and $\overline{X}_{a2}(t)$ and are shown by waveforms 106 and 107, respectively. Upon occurrence of the input-position pulse of $\Delta\theta_1^+(t)$ at 23, flip-flop 201 and $X_{a1}(t)$ go true at 26 in response to the next $C_1(t)$ pulse at 24. Because $\Delta\theta_1^+(t)$ is still true when the next $C_1(t)$ pulse occurs at 25, flip-flop 201 does not respond at that time. However, the flip-flop 201 and $X_{a1}(t)$ do respond to the $C_1(t)$ pulse at 27 by going false at 28. Although the response of flip-flop 201 and $X_{a1}(t)$ to the $\Delta\theta_1^+(t)$ pulse is similar to that just described, only the single $C_1(t)$ pulse at 30 occurs during this incremental input-position pulse. As a result, flip-flop 201 and $X_{a1}(t)$ go true at 31 in response to this $C_1(t)$ pulse but remain true only for an interval of duration $\tau$. Flip-flop 201 and $X_{a1}(t)$ respond to the succeeding $C_1(t)$ pulse at 32 by going false at 33.

The state of flip-flop 202 and, accordingly, that of signal $\overline{X}_{a2}(t)$ always follow the state of flip-flop 201 and that of the signal $X_{a1}(t)$ after a delay of $\tau$. Thus, in response to the trailing edge of the $C_1(t)$ pulse at 25, flip-flop 202 and $\overline{X}_{a2}(t)$ go true at 34. Similarly, in response to the $C_1(t)$ pulse at 35, flip-flop 202 and $\overline{X}_{a2}(t)$ go false at 36 after having been true for an interval of duration $2\tau$. In a like manner, flip-flop 202 and $\overline{X}_{a2}(t)$ respond both to the $C_1(t)$ pulse at 32 by going true at 37 and to the $C_1(t)$ pulse at 38 by returning to the false state at 39. Flip-flop 202 and $\overline{X}_{a2}(t)$ remain true only for an interval of duration $\tau$ in this case, as do flip-flop 201 and $X_{a1}(t)$.

Regardless of the length or relative timing of a $\Delta\theta_1^+(t)$ pulse within limits previously cited, the condition $X_{a1}(t)X_{a2}(t)=1$ is always satisfied for an interval of duration $\tau$ soon after each 0-to-1 transition of such a counterclockwise incremental input-position pulse. This condition is met throughout the interval between the trailing edges of the $C_1(t)$ pulses at 24 and 25 and again throughout the interval between the trailing edges of the $C_1(t)$ pulses at 30 and 32. It is the existence of this condition between consecutive 1-to-0 transitions of $C_1(t)$ to which succeeding components respond. In this manner, synchronized inputs for cyclic-command injector 8 and phase modulator 5 are derived from the input-position signals $\Delta\theta_1^+(t)$ and $Y_a(t)$. It should be noted that $X_{a1}(t)$ and $\overline{X}_{a2}(t)$ would respond exactly as indicated by waveforms 106 and 107 if $\Delta\theta_1^+(t)$ remained false throughout the interval shown in FIG. 4 and waveform 105 represented $Y_a(t)$ instead of $\Delta\theta_1^+(t)$.

The response of flip-flops 301 and 302 of retard synchronizer 3 to position-input pulses is similar to that just described of flip-flops 201 and 202 of advance synchronizer 2, except that flip-flops 301 and 302 are synchronized by the clock signal $C_2(t)$. Typical input pulses of $\Delta\theta_1^-(t)$, each of length $5\tau/4$, are shown in waveform 108. Throughout the time interval shown by waveform 108, $Y_r(t)$ remains false. Flip-flops 301 and 302 respond to $\Delta\theta_1^-(t)$ as indicated by the signals $X_{r1}(t)$ and $\overline{X}_{r2}(t)$ shown in waveforms 109 and 110, respectively. During the $\Delta\theta_1^-(t)$ pulse at 40, the single $C_2(t)$ pulse at 41 occurs. Flip-flop 301 and $X_{r1}(t)$ respond both to this $C_2(t)$ pulse by going true at 42 and to the next $C_2(t)$ pulse at 43 by again going false at 44, thereby yielding an output pulse of duration $\tau$. The $\Delta\theta_1^-(t)$ pulse at 45 remains true during the two $C_2(t)$ clock pulses at 46 and 47. Consequently, flip-flop 301 and $X_{r1}(t)$ respond to the $C_2(t)$ pulse at 46 by going true at 48 and then remain in this state for an interval of duration $2\tau$. Finally, flip-flop 301 and $X_{r1}(t)$ respond to the $C_2(t)$ pulse at 49 by going false at 50.

As was the case with corresponding logic elements of advance synchronizer 2, the output of flip-flop 302 and $\overline{X}_{r2}(t)$ follow the output of flip-flop 301 and $X_{r1}(t)$ after a delay of $\tau$. Consequently, flip-flop 302 and $\overline{X}_{r2}(t)$ respond to the $C_2(t)$ pulse at 43 by going true at 51, to the $C_2(t)$ pulse at 52 by going false at 53, and to the $C_2(t)$ pulses at 47 and 54 by going true and false again at 55 and 56, respectively.

As just explained, the condition $X_{r1}(t)X_{r2}(t)=1$ exists for an interval of duration $\tau$ between the trailing edges of the $C_2(t)$ pulses at 41 and 43 and again between the trailing edges of the $C_2(t)$ pulses at 46 and 47. Indeed, this condition exists for an interval of length $\tau$ between the trailing edges of consecutive $C_2(t)$ pulses in response to each 0-to-1 transition of $\Delta\theta_i^-(t)$ or $Y_r(t)$ as long as these input-position signals meet the requirements previously specified. By this means, synchronized inputs for cyclic-command injector 8 and phase modulator 5 are derived from the input-position signals $\Delta\theta_i^-(t)$ and $Y_r(t)$. As before, $X_{r1}(t)$ and $\overline{X}_{r2}(t)$ would respond exactly as indicated by waveforms 109 and 110 if $\Delta\theta_i^-(t)$ remained false throughout the interval shown in FIG. 4 and waveform 108 represented $Y_r(t)$ instead of $\Delta\theta_i^-(t)$.

Referring again to FIG. 3, another logic diagram appearing there is that of conversion-resolution switch 4. The purpose of conversion-resolution switch 4 is to provide two complementary logical levels to establish, in response to computer or alignment-system commands, the resolution of the signal converter. All resolution-switch inputs are normally false. The respective coarse-resolution and fine-resolution inputs $W_c(t)$ and $W_f(t)$ are asynchronous logical signals generated by the associated digital computer. The additional fine-resolution input $Y_f(t)$ normally consists of single pulses of $C_2(t)$ selected by the alignment system. Specific conditions sufficient to assure proper operation of conversion-resolution switch 4 with the remainder of the signal converter are that (1) all signal-converter inputs from the computer must remain false for an interval of duration no less than $\tau+\tau_c$ before $W_c(t)$, $W_f(t)$, or $Y_f(t)$ goes true, (2) once true, input signal $W_c(t)$ or $W_f(t)$ must remain true for an interval of duration no less than $\tau+\tau_c$, (3) the signals $W_c(t)$, $W_f(t)$, and $Y_f(t)$ must be mutually exclusive, that is, the relation $$W_c(t)W_f(t)+W_f(t)Y_f(t)+W_c(t)Y_f(t)=0 \quad (12)$$

must be satisfied at all times, and (4) the signal $Y_f(t)$ may consist of selected pulses of $C_2(t)$.

Conversion-resolution switch 4 consists of a single flip-flop 401. The coarse-resolution signal $W_c(t)$ is applied to the J input terminal of flip-flop 401, and the fine-resolution input signal $W_f(t)$ is applied to the K input terminal of flip-flop 401. The additional fine-resolution signal $Y_f(t)$ from the alignment system is applied to the override-reset input of flip-flop 401. The 1 output terminal of flip-flop 401 generates the coarse-resolution output signal $X_c(t)$, and the 0 output terminal of flip-flop 401 generates the complement $\overline{X}_c(t)$.

Except for a brief interval after $W_c(t)$ or $W_f(t)$ goes true, the states of the output signals $X_c(t)$ and $\overline{X}_c(t)$ depend upon which resolution input of flip-flop 401 is true or was last true. A resolution-input pulse which commands the same resolution mode as that in which the signal converter is already operating has no effect. The lengths of $W_c(t)$ and $W_f(t)$ pulses have been specified in a manner which assures occurrence, during any such pulse, of at least one complete $C_2(t)$ pulse. Consequently, whenever $W_c(t)$ goes true when flip-flop 401 is false, that flip-flop goes true upon termination of the next complete $C_2(t)$ pulse or, in some cases where a $C_2(t)$ pulse already exists, upon termination of the current $C_2(t)$ pulse. Once flip-flop 401 is in the true state, the signal converter remains in the coarse-resolution mode until the next $W_f(t)$ or $Y_f(t)$ pulse appears.

Similarly, whenever $W_f(t)$ goes true when flip-flop 401 is true, that flip-flop goes false upon termination of the next complete $C_2(t)$ pulse or, in some cases where a $C_2(t)$ pulse already exists, upon termination of the current $C_2(t)$ pulse. Until a $W_c(t)$ pulse appears, the output of resolution switch 4 will then remain in the state $X_c(t)=0$. As long as flip-flop 401 remains false, the signal converter operates in the fine-resolution mode. Alternately, flip-flop 401 can be placed in the false state by a $Y_f(t)$ pulse transmitted to its override-reset input.

Waveforms relating to conversion-resolution switch 4 are shown in FIG. 4. A typical coarse-resolution input signal, $W_c(t)$, is shown in waveform 102, and a typical fine-resolution input signal, $W_f(t)$, appears in waveform 103. The normal output $X_c(t)$ of conversion-resolution switch 4, derived from the 1 output terminal of flip-flop 401, is shown in waveform 104. The false initial state of $X_c(t)$ in waveform 104 indicates that the signal converter is initially operating in the fine-resolution mode.

The first resolution command to appear in FIG. 4 is an asynchronous $W_c(t)$ pulse of length $5\tau/4$ at 57. Two $C_2(t)$ pulses, at 58 and 59, occur during this $W_c(t)$ pulse. In response to the first of these $C_2(t)$ pulses, that at 58, flip-flop 401 and $X_c(t)$ go true at 60, thereby placing the signal converter in the coarse-resolution mode. When the next $C_2(t)$ pulse occurs at 59, flip-flop 401 and $X_c(t)$ do not respond, because flip-flop 401 is already true.

The second resolution command to appear in FIG. 4 is an asynchronous $W_f(t)$ pulse of length $5\tau/4$ at 61. Two $C_2(t)$ pulses, at 62 and 63, occur during this $W_f(t)$ pulse. In response to the first of these $C_2(t)$ pulses, that at 62, flip-flop 401 and $X_c(t)$ return to the false state at 64, again placing the signal converter in the fine-resolution mode.

The fine-resolution input $Y_f(t)$ transmitted from the alignment system remains false throughout the time interval shown in FIG. 4. Conversion-resolution switch 4 responds similarly to $Y_f(t)$ and $W_f(t)$. However, the response to $Y_f(t)$ is instantaneous, rather than synchronous.

Returning now to FIG. 3, the logic diagram of cyclic-command injector 8 is also shown. This component operates only when the signal converter is in the coarse-resolution mode. In this mode, cyclic-command injector 8 functions (1) to generate a cyclic-advance signal $X_{ul}(t)$ consisting of a single $C_2(t)$ pulse shortly after each 0-to-1 transition of $\Delta\theta_i^+(t)$ or $Y_a(t)$ and (2) to generate a cyclic-retard signal $X_{dl}(t)$ consisting of a single $C_2(t)$ pulse shortly after each 0-to-1 transition of $\Delta\theta^-(t)$ or $Y_r(t)$. The signals $X_{ul}(t)$ and $X_{dl}(t)$ are applied to AND gates 19 and 20, respectively, in error-phase decoder 15 shown in FIG. 2. Each such $X_{ul}(t)$ or $X_{dl}(t)$ pulse commands the associated servomechanism to rotate counterclockwise or clockwise, respectively, by $2\pi/n$.

Cyclic-command injector 8 consists of AND gates 801 and 802. The AND gate 801 receives the inputs $X_{a1}(t)$ and $X_{a2}(t)$ from advance synchronizer 2. Similarly, AND gate 802 receives the inputs $X_{r1}(t)$ and $X_{r2}(t)$ from retard synchronizer 3. The AND gates 801 and 802 both receive as inputs the signal $X_c(t)$ from conversion-resolution switch 4 and the clock signal $C_2(t)$. As outputs of cyclic-command injector 8, the cyclic-advance signal $X_{ul}(t)$ is derived from the output of AND gate 801, and the cyclic-retard signal $X_{dl}(t)$ is derived from the output of AND gate 802. When the condition $X_c(t)=1$ causes operation in the coarse-resolution mode, cyclic-command injector 8 emits selected $C_2(t)$ pulses in the manner just described. However, when the condition $X_c(t)=0$ causes operation in the fine-resolution mode, the outputs of AND gates 801 and 802 are inhibited from going true at any time.

It has already been described how, shortly after each 0-to-1 transition of $\Delta\theta_i^+(t)$ or $Y_a(t)$, the outputs of advance synchronizer 2 satisfy the condition $$X_{a1}(t)X_{a2}(t)=1$$

for an interval of duration $\tau$ bounded by the trailing edges of consecutive $C_1(t)$ pulses. Consequently, the AND gate 801 is enabled during this interval if the signal converter is in the coarse-resolution mode, wherein the condition $X_c(t)=1$ exists. The output $X_{ul}(t)$ then includes the $C_2(t)$ pulse which occurs while AND gate 801 is thus enabled.

Similarly, shortly after each 0-to-1 transition of $\Delta\theta_i^-(t)$ or $Y_r(t)$, the inputs $X_{r1}(t)$ and $X_{r2}(t)$ to AND gate 802 from retard synchronizer 3 satisfy the condition $X_{r1}(t)X_{r2}(t)=1$ for an interval of duration $\tau$ bounded by the trailing edges of consecutive $C_2(t)$ pulses. Consequently, the AND gate 802 is enabled during this interval if the signal converter is in the coarse-resolution mode, wherein the condition $X_c(t)=1$ exists. The output $X_{d1}(t)$ then includes the $C_2(t)$ pulse which occurs immediately before the end of the interval during which AND gate 802 is enabled.

Waveforms relating to cyclic-command injector 8 are shown in FIG. 4. The outputs $X_{u1}(t)$ and $X_{d1}(t)$ of AND gates 801 and 802 appear as waveforms 114 and 115, respectively. These signals can go true only during an interval in which a true value of $X_c(t)$ places the signal converter in the coarse-resolution mode. Such an interval extends from 60 to 64 while, in response to the $\Delta\theta_i^+(t)$ pulse at 29, the relation $X_{a1}(t)X_{a2}(t)=1$ is satisfied for the clock period of length $\tau$ bounded by the trailing edges of the $C_1(t)$ pulses at 30 and 32. Consequently, the $C_2(t)$ pulse at 65 appears in the output of AND gate 801 and in $X_{u1}(t)$ at 66. Similarly, during the period when $X_c(t)$ is true, the condition $X_{r1}(t)X_{r2}(t)=1$ is satisfied in the interval of duration $\tau$ bounded by the trailing edges of the $C_2(t)$ pulses at 46 and 47 in response to the $\Delta\theta_i^-(t)$ pulse at 45. Therefore, the $C_2(t)$ pulse at 47 appears in the output of AND gate 802 and in $X_{d1}(t)$ at 67.

Referring once more to FIG. 3, the remaining logic diagram appearing there is that of phase modulator 5. In the coarse-resolution mode, phase modulator 5 provides an output $X_v(t)$ identical to the clock signal $C_1(t)$ for transmission to the input-command carrier generator 6.

In the fine-resolution mode, the pulse rate of the phase-modulator output $X_v(t)$ can be either increased by advance synchronizer 2 or decreased by retard synchronizer 3, thereby varying the total phase of $X_i(t)$ relative to that of the reference carrier $e_r(t)$. The pulse rate of $X_v(t)$ can be temporarily increased and the relative phase of $X_i(t)$ thus advanced by adding individual $C_2(t)$ pulses to $X_v(t)$. Conversely, the pulse rate of $X_v(t)$ can be temporarily decreased and the relative phase of $X_i(t)$ thus retarded by inhibiting individual $C_1(t)$ pulses from $X_v(t)$.

Phase modulator 5 consists of a pair of AND gates, 501 and 503, and a pair of OR gates, 502 and 504. At its inputs, AND gate 501 receives the outputs $X_{a1}(t)$ and $X_{a2}(t)$ of advance synchronizer 2, the signal $\overline{X}_c(t)$ from conversion-resolution switch 4, and the clock signal $C_2(t)$. The output of AND gate 501 is applied as a first input to OR gate 504. To derive the remaining input of OR gate 504, at its inputs OR gate 502 receives $\overline{X}_{r1}(t)$ and $\overline{X}_{r2}(t)$ from retard synchronizer 3 and $X_c(t)$ from conversion-resolution switch 4. The output of OR gate 502 constitutes one input of AND gate 503, and the clock signal $C_1(t)$ constitutes the other. The output of AND gate 503 is the remaining input of OR gate 504. The OR gate 504 generates the output signal $X_v(t)$ of the phase modulator. In this manner, the output $V_v(t)$ of phase modulator 5 is synthesized from signals from two different sources. To appear in $X_v(t)$, clock pulses can pass through gates 503 and 504 or through gates 501 and 504.

In the coarse-resolution mode, the signal $X_c(t)=1$ is applied to OR gate 502. Consequently, the output of OR gate 502 is always true in this mode. Therefore, in the coarse-resolution mode, AND gate 503 is continuously enabled, and the clock signal $C_1(t)$ can precede unaltered through AND gate 503 and OR gate 504 to appear as the output signal $X_v(t)$. Because AND gate 501 is inhibited by the input $\overline{X}_c(t)=0$ in the coarse-resolution mode, this gate makes no contribution to $X_v(t)$ in this mode.

In the fine-resolution mode, circumstances differ from those just described. The input $X_c(t)$ applied to OR gate 502 is false. Consequently, the output of OR gate 502 goes true only when at least one of the other two gate inputs goes true to satisfy the relation $$\overline{X}_{r1}(t)+\overline{X}_{r2}(t)=1 \qquad (13)$$

Relation (13) is satisfied as long as no clockwise input-position signals appear, and $X_v(t)$ then continues to include all $C_1(t)$ pulses. However, for a single clock period closely following each 0-to-1 transition of $\Delta\theta_i^-(t)$ or $Y_r(t)$, and both beginning and ending with the trailing edges of consecutive pulses of $C_2(t)$, the condition $$\overline{X}_{r1}(t)+\overline{X}_{r2}(t)=0 \qquad (14)$$

exists. Any $C_1(t)$ pulse which occurs while Relation (14) is satisfied is inhibited at AND gate 503 and does not appear in $X_v(t)$. The relative phase of the input-position carrier $X_i(t)$ is thus retarded in the fine-resolution mode shortly after each $\Delta\theta_i^-(t)$ or $Y_r(t)$ pulse begins.

The input $\overline{X}_c(t)$ of AND gate 501 is continuously true in the fine-resolution mode. Because another input of AND gate 501 is the clock signal $C_2(t)$, any $C_2(t)$ pulse occurring when the remaining two gate inputs $X_{a1}(t)$ and $X_{a2}(t)$ satisfy the condition $$X_{a1}(t)X_{a2}(t)=1 \qquad (15)$$

appears at the output of AND gate 501 and is added to $X_v(t)$ via OR gate 504. The signals $X_{a1}(t)$ and $X_{a2}(t)$ generated by advance synchronizer 2 satisfy Relation (15) for an interval of duration $\tau$ bounded by the trailing edges of consecutive $C_1(t)$ pulses shortly after each 0-to-1 transition of $\Delta\theta_i^+(t)$ or $Y_a(t)$. The $C_2(t)$ pulse which occurs during each such interval appears in $X_v(t)$, thereby advancing the relative phase of the input-position carrier $X_i(t)$.

Waveforms relating to phase modulator 5 are shown in FIG. 4. The output of AND gate 501 is shown in waveform 111, the output of AND gate 503 in waveform 112, and the output $X_v(t)$ of OR gate 504 in waveform 113. The output signal $X_v(t)$ is the OR function of the outputs of gates 501 and 503. In the steady state with all clockwise and counterclockwise input-position signals false, the pulse train $X_v(t)$ consists only of the pulses of the clock signal $C_1(t)$ shown in waveform 100. The signal $X_v(t)$ can be modulated by inhibiting selected $C_1(t)$ pulses or by adding selected $C_2(t)$ pulses from waveform 101 only when the state $X_c(t)=0$, indicating operation in the fine-resolution mode, exists as shown at 68.

When in the fine-resolution mode, phase modulator 5 is first responsive to the $\Delta\theta_i^+(t)$ pulse at 23 commanding an increment of counterclockwise motion. By means already described, this $\Delta\theta_i^+(t)$ pulse causes Relation (15) to be satisfied in the interval between the trailing edges of the consecutive $C_1(t)$ pulses at 24 and 25. The AND gate 501 is enabled during this interval, thus permitting the $C_2(t)$ pulse at 69 to be emitted at 70. This pulse is then transmitted by OR gate 504 to appear in $X_v(t)$ at 71, thereby momentarily increasing the pulse rate of $X_v(t)$.

Phase modulator 5 next responds to the $\Delta\theta_i^-(t)$ pulse at 40 commanding an increment of clockwise motion. As already described, this $\Delta\theta_i^-(t)$ pulse causes Relation (14) to be satisfied during the period between the trailing edges of the consecutive $C_2(t)$ pulses at 41 and 43. The AND gate 503 in inhibited during this interval, thereby preventing the $C_1(t)$ pulse at 72 from appearing either at 73 in the output of AND gate 503 or at 74 in $X_v(t)$. In this manner, the pulse rate of $X_v(t)$ is briefly decreased.

Figure 5:
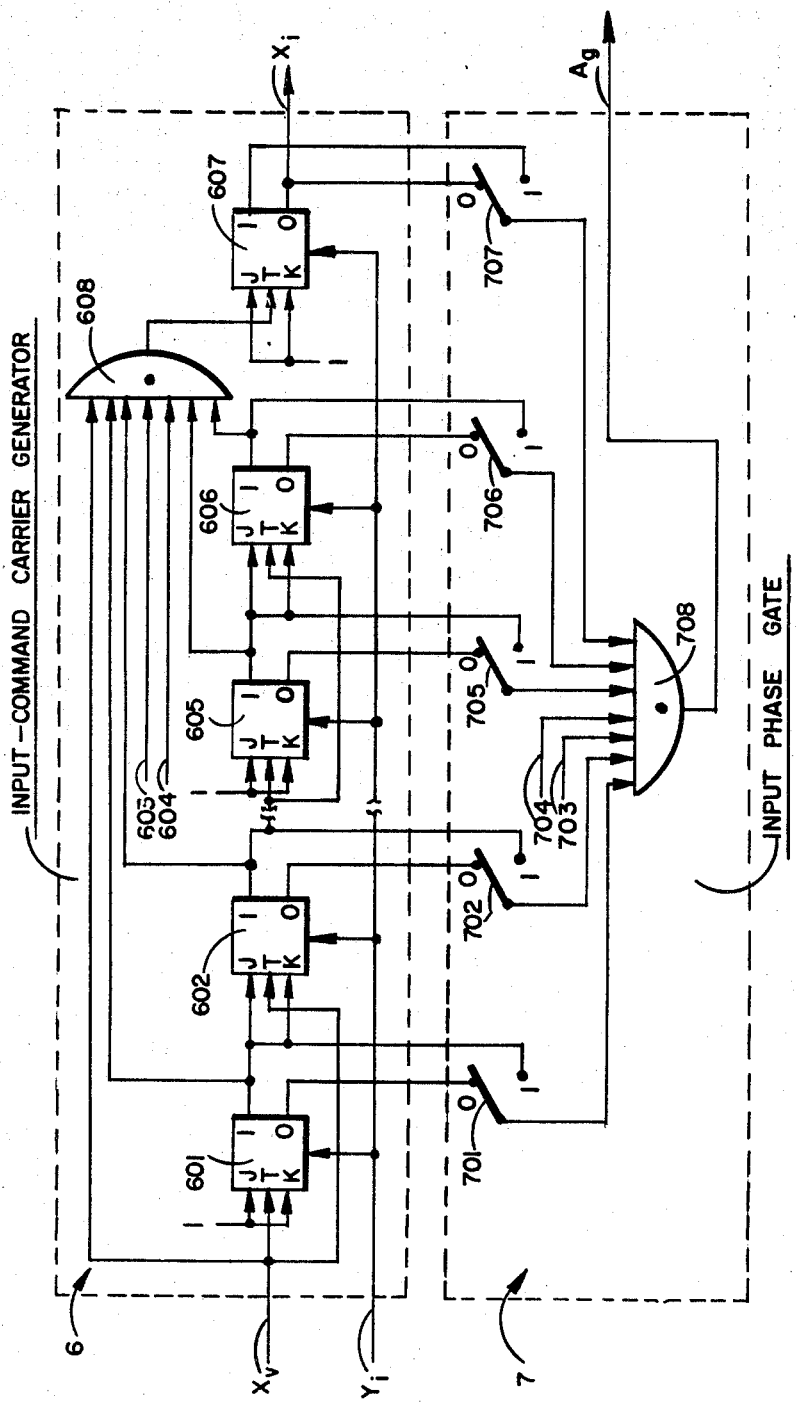
FIG. 5 is a more detailed diagram of the input-command carrier generator and the input-phase gate, both components of the dual-resolution signal converter.

Turning now to FIG. 5, there are shown the logic diagrams of input-command carrier generator 6 and input-phase gate 7. Input-command carrier generator 6 is essentially a $q$-stage binary counter of special design having $m=2^q$ possible states and driven by the signal $X_v(t)$ from phase modulator 5.

The basic function of input-command carrier generator 6 is to generate a logical carrier signal, $X_i(t)$, having a relative phase $\phi_i(t)$ as defined in Relations (8a) and (8b). The flip-flops in input-command carrier generator 6 operate to count the pulses of $X_v(t)$ in a cyclic manner at all times. Once input-command carrier generator 6 has reached a state wherein each flip-flop is false, $X_i(t)$ changes state in response to each train of $m$ additional pulses of $X_v(t)$ received. The signal $X_i(t)$ is obtained from the 0 output terminal of the highest-order flip-flop in the counter. When the signal converter has responded completely to every $\Delta\theta_i^+(t)$ and $\Delta\theta_i^-(t)$ pulse applied to it, the relative phase angle of $e_i(t)$ is $$\phi_i(t) = 2\pi \left[ \frac{n_{if}^+(t) - n_{if}^-(t)}{m} + n_{ic}^+(t) - n_{ic}^-(t) \right] \quad (16)$$

where $n_{if}^+(t)$ is the number of complete $\Delta\theta_i^+(t)$ pulses applied to the signal converter in the fine-resolution mode, $n_{if}^-(t)$ is the number of complete $\Delta\theta_i^-(t)$ pulses applied to the signal converter in the fine-resolution mode, $n_{ic}^+(t)$ is the number of complete $\Delta\theta_i^+(t)$ pulses applied to the signal converter in the coarse-resolution mode, and $n_{ic}^-(t)$ is the number of complete $\Delta\theta_i^-(t)$ pulses applied to the signal converter in the coarse-resolution mode, all since completion of the last alignment. The exact time at which $\phi_i(t)$ changes in response to a $\Delta\theta_i^+(t)$ or $\Delta\theta_i^-(t)$ pulse is determined by considerations previously discussed in connection with the operation of advance and retard synchronizers 2 and 3, cyclic-command injector 8, and phase modulator 5.

Input-command carrier generator 6 also provides $2^q$ outputs for input-phase gate 7. As shown in FIG. 5, this set of logical signals has the members $A_k$ and $\overline{A}_k$, where $0 \leq k < q$, and consists of the normal and complement outputs of every flip-flop in the carrier generator.

As shown in FIG. 1, input-command carrier generator 6 has two logical inputs: the modulated pulse train $X_v(t)$ from phase modulator 5 and the input-phase-set signal $Y_i(f)$ from alignment system 13 in FIG. 2. As previously described, $X_v(t)$ is always identical to the clock signal $C_1(t)$ in the steady state when $\Delta\theta_i^+(t), \Delta\theta_i^-(t), Y_a(t),$ and $Y_r(t)$ are all false. In the fine-resolution mode, the relative phase $\phi_i(t)$ is advanced in increments of $2\pi/m$ by adding selected $C_2(t)$ pulses to $X_v(t)$ and is retarded in steps of identical absolute value by inhibiting selected $C_1(t)$ pulses from $X_v(t)$. The input-phase-set signal $Y_i(t)$ consists of individual $C_2(t)$ pulses selected by the alignment system. This input is applied as an override-reset signal to every flip-flop in input-command carrier generator 6 to set the input-command count to 0. The alignment system and computer program are both so arranged that $$\Delta\theta_i^+(t) + \Delta\theta_i^-(t) + Y_a(t) + Y_r(t) = 0 \quad (17)$$

when $Y_i(t) = 1$ and for several clock periods before and after this state of $Y_1(t)$ occurs.

The number of counter stages $q$ employed in input-command carrier generator 6 depends upon the requirements of the associated servomechanism. In particular, $q$ is chosen to yield a value of $m$ which makes the steady-state angular frequency of the fundamental sinusoidal component of the input carrier $X_i(t)$ equal to $\omega_r$ when $\Delta\theta_i^+(t), \Delta\theta_i^-(t), Y_a(t),$ and $Y_r(t)$ are all false, where $\omega_r$ is the angular frequency of the reference carrier $e_r(t)$. In the case $q=7$ to be considered, input-command carrier generator 6 consists of seven flip-flops, 601 through 607, and an AND gate, 608, which together constitute a binary counter of special design. Because systematic means will be described for connecting every flip-flop in input-command carrier generator 6 and because the resultant connections of flip-flops 603 and 604 are similar to those of flip-flops 601 and 602 and of flip-flops 605 and 606, flip-flops 603 and 604 are not shown in FIG. 5. The count stored in input-command carrier generator 6 is $$C_i(t) = \sum_{k=0}^{q-i} F_{601+k}(t) 2^k \quad (18)$$

where the variable $F_{601+k}(t)$ represents the instantaneous state (0 or 1) of flip-flop $601+k$. Relation (18) involves conventional algebraic, rather than logical, operations.

For logic elements of a given type, the counter design employed minimizes the effect of propagation delay within the counter and almost completely eliminates the effect of propagation delay upon the response of the highest-order stage without introducing significant complexity. In comparison to the simplest possible counter of the same capacity, a seven-stage ripple counter, the only additional component required is AND gate 608. The advantages of this counter design are especially important in the present application to permit a large number of counter stages to be employed with a given clock rate for fine conversion resolution and to provide a wide margin of safety in counter timing.

More particularly, in FIG. 5 the J and K terminals of flip-flops 601, 603, and 605 are connected to an input of fixed logical value 1. The input $X_v(t)$ is applied to the T input terminals of flip-flops 601 and 602 and as a first input to AND gate 608. Similarly, the 1 output terminal of flip-flop 602 is connected to the T input terminals of flip-flops 603 and 604, and the 1 output terminal of flip-flop 604 is connected to the T input terminals of flip-flops 605 and 606. Within the typical doublet composed of flip-flops 601 and 602, the 1 output terminal of flip-flop 601 is connected to the J and K input terminals of flip-flop 602. The connection patterns between flip-flops 603 and 604 and between flip-flops 605 and 606 are the same as that just described between flip-flops 601 and 602. The 1 output terminal of each of the flip-flops 601 through 606 is connected to a separate remaining input of AND gate 608. The input $Y_i(t)$ is applied to the override-reset input of each of flip-flops 601 through 607. The J and K input terminals of flip-flop 607 are connected to a signal of fixed logical value 1, and the T input terminal of flip-flop 607 is connected to the output of AND gate 608. The output $X_i(t)$ is then derived from the 0 output terminal of flip-flop 607. In addition, outputs from the 1 and 0 terminals of each of the flip-flops 601 through 607 constitute inputs to input phase gate 7.

Except for the highest-order flip-flop when $q$ is odd, the counter flip-flops are connected to form doublets such as 601–602, 603–604, and 605–606 in FIG. 5. Because a trigger signal is applied in parallel to the T input terminals of both flip-flops of a doublet, a doublet has the same propagation delay as a single flip-flop. Consequently, the low-order counter consisting of flip-flops 601 through 606 has only half of the propagation delay of a ripple counter of the same capacity and yet requires no more equipment than such a ripple counter. A counter of the ripple type is shown in FIG. 3 of U.S. Pat. No. 3,474,414, by Charles E. Lenz entitled "Wave-Edge Comparator."

Each doublet consists of a first flip-flop and a second flip-flop. A trigger input is applied in parallel to the T terminals of both flip-flops. The lowest order doublet utilizes $X_v(t)$ as a trigger signal. Each remaining doublet receives its trigger input from the 1 output terminal of the second flip-flop of the preceding doublet, except in the case to be discussed later of the highest order doublet when $q$ is even. In addition, a fixed input of logical value 1 is applied to the J and K terminals of the first flip-flop in each doublet, and a signal generated by the 1 output terminal of the first flip-flop is applied to the J and K input terminals of the second flip-flop.

Flip-flops 601 and 602 together form a typical doublet, whose operation will now be described. Immediately after resetting by $Y_i(t)$, each of these two flip-flops is in the false state. Thereafter, flip-flop 601 changes state in response to each 1-to-0 transition of the doublet trigger input $X_v(t)$ because the J and K terminals of flip-flop 601 both receive inputs of fixed logical value 1. Although flip-flop 602 also receives the trigger signal $X_v(t)$ at its T terminals, this flip-flop is connected to change state only in response to 1-to-0 transitions at its T input terminal when flip-flop 601 is true. Therefore, flip-flop 602 is responsive only to alternate 1-to-0 transitions of $X_v(t)$. Consequently, flip-flops 601 and 602 together form a 2-bit binary counter responsive to all 1-to-0 transitions of the trigger signal applied to the T terminals of both flip-flops. In response to each such 1-to-0 transition of the trigger signal, this 2-bit counter counts successively from binary 00 to binary 11, returns to binary 00, and then continues to recycle in the same manner, where the bits constituting the binary numbers stated correspond to the states of flip-flops 602 and 601, respectively. The output from the 1 terminal of second flip-flop 602 constitutes the trigger input for the succeeding doublet if more than two higher-order flip-flops remain in the entire counter. The doublets 603–604 and 605–606 also operate in the manner just described.

To further reduce delay in triggering transitions of the carrier $X_i(t)$, the highest-order flip-flop of the counter is triggered by the input $X_v(t)$ transmitted by a single AND gate at 608. Two cases must be considered: Case 1 relates to counters with an odd number of flip-flops, and Case 2 relates to those with an even number of flip-flops. In Case 1, the gate triggers a single flip-flop whose inputs and outputs to input-phase gate 7 are connected in the same manner as those of the first flip-flop in a doublet; in Case 2, the gate triggers a doublet. In either case, the output of the 1 terminal of the highest order flip-flop employed, 607 in FIG. 5, constitutes the output $X_i(t)$ of input-command carrier generator 6. Case 1 is illustrated in FIG. 5.

One input to AND gate 608 is the modulated pulse train $X_v(t)$. The remaining inputs to this gate are generated at the 1 terminals of all counter flip-flops except for the one (Case 1) or two (Case 2) of highest order. Consequently, when all flip-flops connected to its inputs are in true states, AND gate 608 is enabled. The 1-to-0 transition of the next $X_v(t)$ pulse then (1) returns each flip-flop driving gate 608 to the false state and (2) causes the output flip-flop to change state (Case 1) or the output doublet to either increase its count by one or recycle to the binary count 00 (Case 2). Because the complement output of the highest-order counter flip-flop is the carrier signal $X_i(t)$, a transition of $X_i(t)$ is delayed from the 1-to-0 transition of $X_v(t)$ which initiated it only by the sum of the propagation times of a single flip-flop and one gate in both Case 1 and Case 2.

Figure 6:
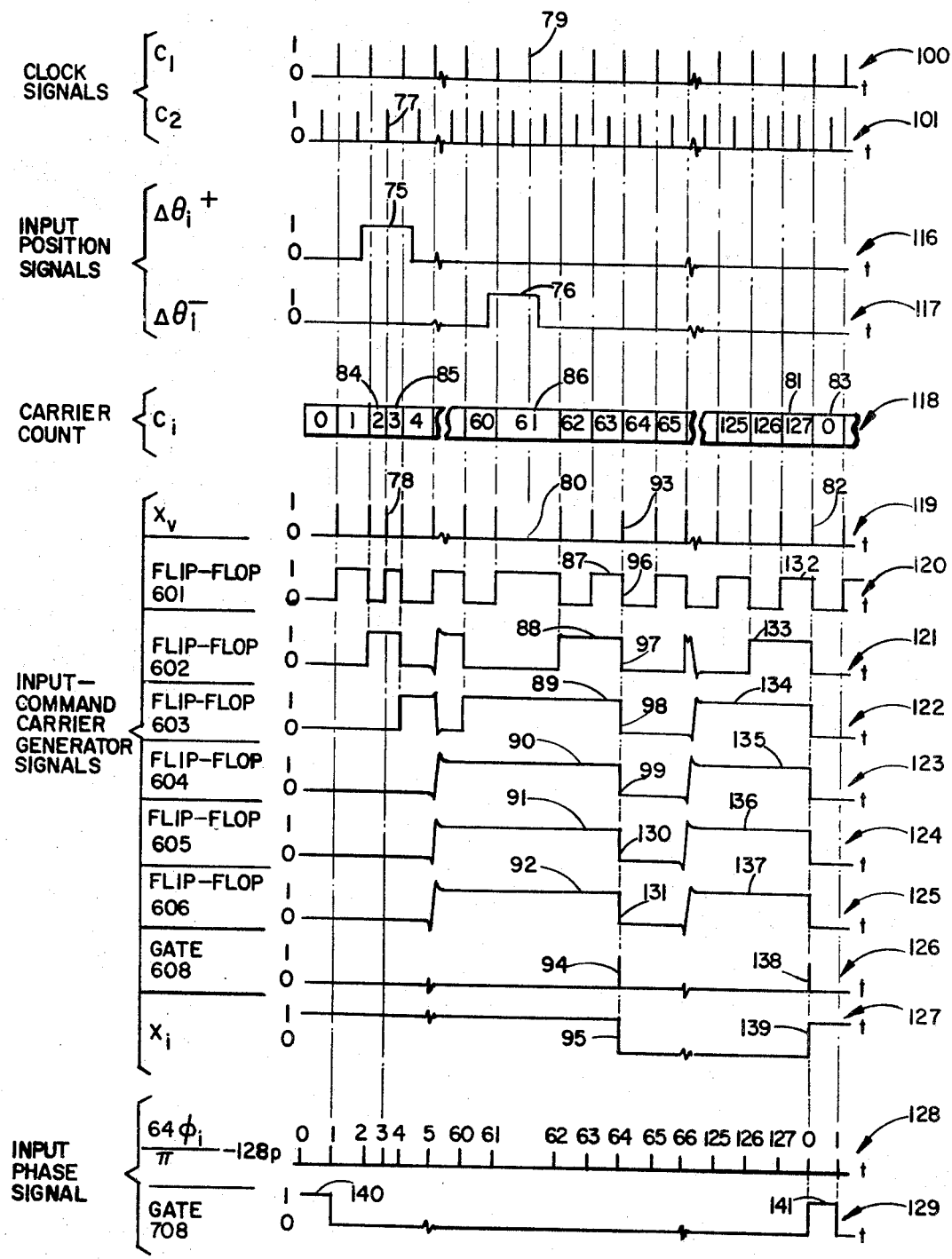
FIG. 6 shows a series of waveforms useful in explaining operation of the input-command carrier generator and the input-phase gate.

Waveforms relating to input-command carrier generator 6 are shown in FIG. 6. A jagged discontinuity in a waveform in FIG. 6 indicates a time lapse during which one or more logical transitions may or may not occur. As previously stated, the primary and secondary clock signals $C_1(t)$ and $C_2(t)$ shown in waveforms 100 and 101, respectively, are used by phase modulator 5 to synthesize the principal input signal $X_v(t)$ to carrier generator 6. Throughout FIG. 6, the dual-resolution signal converter is operating in the fine-resolution mode.

In the steady state with $\Delta\theta_i^+(t)$, $\Delta\theta_i^-(t)$, $Y_a(t)$, and $Y_r(t)$ all false, the carrier-generator input $X_v(t)$ shown at 119 is identical to $C_1(t)$. However, in response to the $\Delta\theta_i^+(t)$ pulse at 75, the single $C_2(t)$ pulse at 77 is soon added to $X_v(t)$ at 78. Similarly, in response to the $\Delta\theta_i^-(t)$ pulse at 76, the $C_1(t)$ pulse at 79 is inhibited from appearing in $X_v(t)$ at 80. The method by which $X_v(t)$ is generated has already been explained in detail in discussing synchronizers 2 and 3 and phase modulator 5.

Each pulse of the signal $X_v(t)$ causes the input count $C_i(t)$ shown at 118 to increase by 1 when $0 \leq C_i(t) \leq 126$. However, once $C_i(t) = 127$ as shown at 81, for example, the trailing edge of the next $X_v(t)$ pulse, in this case at 82, causes $C_i(t)$ to recycle to 0, as shown at 83. In the steady state with $\Delta\theta_i^+(t)$, $\Delta\theta_i^-(t)$, $Y_a(t)$, and $Y_r(t)$ all false, the count $C_i(t)$ remains fixed for a length of time equal to one complete clock period $\tau$ minus the settling time of the counter. However, whenever the relative phase $\phi_i(t)$ of the input-position carrier $X_i(t)$ is being advanced by $2\pi/m$, two consecutive counts are retained only for intervals of approximate duration $\tau/2$, as shown at 84 and 85. Conversely, whenever the relative phase $\phi_i(t)$ of $X_i(t)$ is being retarded by $2\pi/m$, a single count is retained for an interval of approximate duration $2\tau$, as shown at 86.

In accordance with Relation (18), the input count $C_i(t)$ is represented in binary form by the states of flip-flops 601 through 606, shown in waveforms 120 through 125, in conjunction with the state of flip-flop 607, which is the complement of the signal $X_i(t)$ shown in waveform 127. In the input-count interval $0 \leq C_i(t) \leq 63$, the state of flip-flop 607 is false. The output of AND gate 608, shown in waveform 126, also remains in the false state. When $C_i(t) = 63$ (binary 0111111), the state of each of flip-flops 601 through 606 is equal to 1, as shown at 87 through 92. Consequently, AND gate 608 is enabled to transmit the $X_v(t)$ pulse at 93. This pulse appears at 94 in the normally false output of AND gate 608. Flip-flop 607 responds to the trailing edge of the pulse at 94 by going true, thereby causing the signal $X_i(t)$ generated at its 0 output terminal to go false at 95. The trailing edge of the pulse at 94 also causes all other counter flip-flops to go false, as shown at 96 through 99, at 130, and at 131. The count $C_i(t)$ now continues to increase until $C_i(t) = 127$ (binary 1111111) at 81. The AND gate 608 is then enabled once again by the mutually true states of flip-flops 601 through 606 shown at 132 through 137. Consequently, the $X_v(t)$ pulse at 82 is transmitted by AND gate 608 at 138. Flip-flop 607 responds to the trailing edge of the pulse at 138 by going false, causing its complement output $X_i(t)$ to go true at 139. The input count $C_i(t)$ simultaneously recycles to 0.

Again with reference to FIG. 5, there is shown the logic diagram of input-phase gate 7. The function of input-phase gate 7 is to provide a single logical output, the normally false enabling signal $A_g(t)$. By going true for an interval of approximate length $\tau$ once during each cycle of the input-position carrier $X_i(t)$, the signal $A_g(t)$ indicates when the instantaneous value of the total angle $$\Phi_i(t) = \omega_r t + \phi_i(t) \tag{19}$$

of $X_i(t)$ is within any of a set of predetermined quantization elements whose lower bounds differ successively by $2\pi$. The terms in the right member of Relation (19) have been defined previously.

Input-phase gate 7 has a set of $2q$ inputs with the members $A_k(t)$ and $\overline{A}_k(t)$, where $0 \leq k < q$ and the positive integer $q$ equals the number of counter flip-flops in input-command carrier generator 6. Each of these inputs is derived from either the 1 or 0 output terminal of a flip-flop in input-command carrier generator 6. Internally, input-phase gate 7 consists of an AND gate, denoted $701+q$, and $q$ single-pole double-throw switches. Each switch is denoted by an integer $701+k$, where the integer $k$ lies within the interval $0 \leq k < q$. The common terminal of each switch is connected to a separate input of AND gate $701+q$. For each permissible value of $k$, the remaining two terminals of switch $701+k$ are denoted 1 and 0 and are connected to the 1 and 0 terminals, respectively, of flip-flop $601+k$ in input-command carrier generator 6.

In FIG. 5, the number of flip-flops $q$ is 7. The input-phase gate 7 consists of single-pole double-throw switches 701 through 707 along with AND gate 708. FIG. 5 shows the connections to all switches except 703 and 704. The connections to switches 703 and 704 are similar to those of the other switches shown in FIG. 5 and are uniquely determined by the principles previously enumerated in regard to all switches. In particular, the common terminal of each of switches 701 through 707 is connected to a separate input of AND gate 708. The remaining terminals of each of switches 701 through 707 are denoted 1 and 0 and are connected to the corresponding 1 and 0 terminals of flip-flops 601 through 607, respectively, in input-command carrier generator 6. The output $A_g(t)$ of input-phase gate 7 is obtained from the output of AND gate 708.

Input-phase gate 7 provides a true outoput signal $A_g(t)=1$ capable of enabling an external gate when, and only when, $$\frac{2\pi i}{m} < \phi_i(t) - 2\pi p(t) \leq \frac{2\pi(j+1)}{m} \quad (20)$$

In Relation (20), the integer $m$ equals the number of internal states of input-command carrier generator 6, the non-negative integer $p(t)$ is chosen to satisfy the relation $$\frac{\phi_i(t)}{2\pi} - 1 \leq p(t) < \frac{\phi_i(t)}{2\pi} \quad (21)$$

and the non-negative integer $j$ is established by setting switches 701 through 707 in accordance with the relation $$j = \sum_{k=0}^{q-1} S_{701+k} 2^k \quad (22)$$

Although the variable $S_{701+k}$ represents the instantaneous logical state (0 or 1) of switch $701+k$, Relation (22) involves conventional algebraic, rather than logical, operations. In FIG. 5, a switch is in the 0 state when in the upper position and in the 1 state when in the lower position.

The output of AND gate 708 can be employed to enable another AND gate external to the input-phase gate. A clock signal can be applied to a separate input of the external AND gate to eliminate any effects of possible extraneous excursions of the signal output of AND gate 708 during the settling interval following each 1-to-0 transition of $X_v(t)$. In cases where the relative input phase $\phi_i(t)$ must be determined only in the steady state with $\Delta\theta_i^+(t)$, $\Delta\theta_i^-(t)$, $Y_a(t)$, and $Y_r(t)$ all false, the clock input of the external AND gate can be connected to either $C_1(t)$ or $C_2(t)$. In other applications where the output of the external AND gate must be significant even during intervals in which $\phi_i(t)$ is being varied, the clock input of the external AND gate can be connected to $X_v(t)$. Alternatively, in some applications it may be desirable to connect either $C_1(t)$, $C_2(t)$, or $X_v(t)$ directly to an additional input of AND gate 708 without use of an external gate. The considerations which then govern the choice between $C_1(t)$, $C_2(t)$, and $X_v(t)$ are the same as those cited for the case where an external AND gate is employed.

The last two waveforms in FIG. 6 relate to input-phase gate 7 for the case where $q=7$ and, consequently, where $m=2^q=128$. Instantaneous integral values of a function $f_1(t)$ are plotted versus time at 128, where $$0 \leq f(t) = \frac{m\phi_i(t)}{2} - mp(t) < m \quad (23)$$

In relation (23), $p(t)$ is a non-negative integer chosen to permit the inequalities shown in that relation to be satisfied, and all other symbols have the meanings given previously. The output of AND gate 708 is shown in waveform 129 for the case where the settings of switches 701 through 707 yield the value $j=0$ in Relation (22). This signal from AND gate 708 goes true for intervals of approximate duration $\tau$ at 140 and 141 in accordance with Relation (20), that is, when $$j < f_1(t) \leq j+1 \quad (24)$$

The parameter $p(t)$ shown in Relation (20) has the value $p(t)=0$ at 140 and $p(t)=1$ at 141 in waveform 129.

Figure 7:
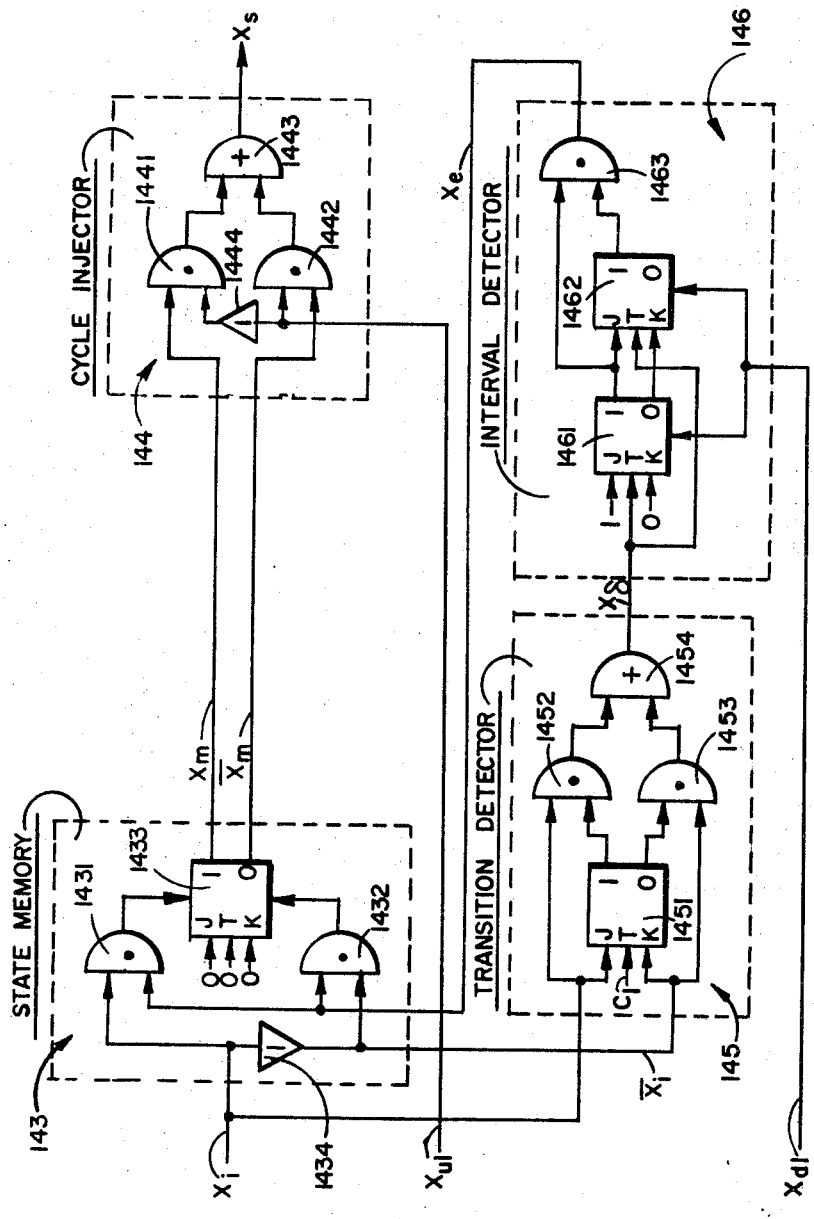
FIG. 7 is a detailed diagram of an optional output synthesizer for use as the output stage of the dual-resolution signal converter.

Referring now to FIG. 7, there is shown the logic diagram of an optional output synthesizer which permits broader application of the dual resolution signal converter. The output synthesizer combines the logical input-position carrier $X_i(t)$, the cyclic-advance signal $X_{u1}(t)$ and the cyclic-retard signal $X_{d1}(t)$ into a signal unified phase-modulated logical carrier output $X_s(t)$ which can be applied directly to a broad class of phase demodulators and phase comparators.

The phase of the synthesizer carrier $X_s(t)$ can be interpreted by any phase detector or phase comparator which measures phase by counting level crossing of a phase-modulated signal. In the steady state with no $\Delta\theta_i^+(t)$, $\Delta\theta_i^-(t)$, $Y_a(t)$, or $Y_r(t)$ pulses applied to the dual-resolution signal converter, the synthesizer carrier $X_s(t)$ is essentially identical to the input-position carrier $X_i(t)$. However, such $\Delta\theta_i^+(t)$, $\Delta\theta_i^-(t)$, $Y_a(t)$, or $Y_r(t)$ pulse applied to the dual-resolution signal converter when it is operating in the fine-resolution mode advances or retards the phase of $X_s(t)$ by $2\pi/m$. Moreover each $\Delta\theta_i^+(t)$, $\Delta\theta_i^-(t)$, $Y_a(t)$, or $Y_r(t)$ pulses applied to the dual-resolution signal converter when it is operating in the coarse-resolution mode advances or retards the phase of $X_s(t)$ by a full $2\pi$. Consequently, if the dual-resolution signal converter is designed using a large value of $m$ to permit critical resolution in the fine-resolution mode, the increments by which the relative phase of $X_s(t)$ varies during modulation in each of the two resolution modes will differ greatly in absolute value.

If $X_s(t)$ is substituted for $X_i(t)$ in Relations (8a) and (8b), these relations also define $X_s(t)$ as a function of $\omega_r$, $t$, and $\phi_i(t)$. Nevertheless, significant differences exist between $X_i(t)$ and $X_s(t)$. In particular, in the coarse-resolution mode, Relation (8a) and (8b) can be used to determine $\phi_i(t)$ by comparison of $X_i(t)$ with $e_r(t)$ only if $X_{d1}(t)$ and $X_{u1}(t)$ are also transmitted to the associated servomechanism. In either resolution mode, however, these relations can be used to determine $\phi_i(t)$ by comparison of $X_s(t)$ alone with $e_r(t)$.

The frequency of $X_s(t)$ can be varied over a much greater range than can the frequency of $X_i(t)$ if transmission of $X_{d1}(t)$ and $X_{u1}(t)$ to the associated servomechanism is precluded, because then $X_s(t)$ can be used in either resolution mode but $X_i(t)$ can only be used in the fine-resolution mode. Due to previously specified input-pulse constraints, the minimum permissible period of each of the input-position signals $\Delta\theta_i^+(t)$, $\Delta\theta_i^-(t)$, $Y_a(t)$, and $Y_r(t)$ is $2(\tau+\tau_c)$, where $\tau$ is the clock period and $\tau_c$ is the clock-pulse length. If $m$ pulses of $X_v(t)$ are required to produce one cycle of $X_i(t)$ and no pulses are being transmitted by $\Delta\theta_i^+(t)$, $\Delta\theta_i^-(t)$, $Y_a(t)$, or $Y_r(t)$, then the frequency of $X_i(t)$ in the fine-resolution mode, $f_{if}(t)$, assumes the steady-state value $$[f_{if}(t)]_{ss} = \frac{f_c}{m} = \frac{1}{m\tau} \quad (25)$$

where $f_c$ is the pulse rate of $C_1(t)$ and all other symbols have the meanings previously shown. When either $\Delta\theta_i^+(t)$ or $Y_a(t)$ pulses are being transmitted at the maximum permissible rate, the highest possible value of $f_{if}(t)$ results and is equal to $1/m$ times the sum of the pulse rates of $C_1(t)$ and $\Delta\theta_i(t)$, so that $$[f_{if}(t)]_{max} = \frac{1}{m}\left[\frac{1}{\tau} + \frac{1}{2(\tau+\tau_c)}\right] = \frac{3\tau+2\tau_c}{2m\tau(\tau+\tau_c)} \quad (26)$$

Because $$\frac{\partial}{\partial \tau_c}[f_{if}(t)]_{max} = \frac{-1}{2m(\tau+\tau_c)^2} < 0 \quad (27)$$

the maximum value of $f_{if}(t)$ is a monotonically decreasing function of $\tau_c$ over the permissible range of the latter parameter. Consequently, if $\tau_c$ approaches 0, the maximum value of $f_{if}(t)$ increases asymptotically toward $$\lim_{\tau_c < 0}[f_{if}(t)]_{max} = \frac{3}{2m\tau} = \frac{3}{2}[f_{if}(t)]_{ss} \quad (28)$$

Therefore, with the input-pulse constraints previously specified and fixed parameters, it is impossible to increase $f_{if}(t)$ as much as 50% from its steady-state value. Conversely, when either $\Delta\theta_i^-(t)$ or $Y_r(t)$ pulses are being transmitted at the maximum permissible rate, the minimum possible value of $f_{if}(t)$ results and is equal to $1/m$ times the difference between the pulse rates of $C_1(t)$ and $\Delta\theta_i^-(t)$ or $Y_r(t)$, namely.

$$f_{if}(t)_{\min} = \frac{1}{m}\left[\frac{1}{\tau} - \frac{1}{2(\tau+\tau_c)}\right] = \frac{\tau+2\tau_c}{2m\tau(\tau+\tau_c)} \quad (29)$$

Because $$\frac{\delta}{\delta\tau_c}[_{if}(t)_{\min}] = \frac{1}{2m(\tau+\tau_c)^2} > 0, \quad (30)$$

the minimum value of $f_{if}(t)$ is a monotonically increasing function of $\tau_c$ over the permissible range of the latter parameter. Consequently, if $\tau_c$ approaches 0, the minimum value of $f_{if}(t)$ decreases asymptotically toward $$\lim_{\tau_c \to 0}[f_{if}(t)]_{\min} = \frac{1}{2m\tau} = \frac{1}{2}[f_{if}(t)]_{ss} \quad (31)$$

Therefore, with the input-pulse constraints previously specified, and fixed parameters, it is impossible to decrease $f_{if}(t)$ as much as 50% from its steady-state value. Relations (25) through (31) also apply to $f_{sf}(t)$, the frequency of $X_s(t)$ in the fine-resolution mode. In this resolution mode, the output synthesizer does not significantly affect the operation of the dual-resolution signal converter.

The frequency of $X_s(t)$ in the coarse-resolution mode, $f_{sc}(t)$, can be decreased to the value $$[f_{sc}(t)]_{\min} = 0 \quad (32)$$

by transmitting $\Delta\theta_i^-(t)$ or $Y_r(t)$ pulses at a rate of $1/m\tau$. To avoid error in the relative input phase $\phi_i(t)$, neither $\Delta\theta_i^-(t)$ nor $Y_r(t)$ pulses may be transmitted at a higher rate in this mode. With the normal input-pulse constraints, $f_{sc}(t)$ can also be increased to the value $$[f_{sc}(t)]_{\max} = \frac{1}{m\tau} + \frac{1}{2(\tau+\tau_c)} = \frac{(m+2)\tau+2\tau_c}{2m\tau+(\tau+\tau_c)} \quad (33)$$

Because $$\frac{\delta}{\delta\tau_c}[f_{sc}(t)]_{\max} = \frac{-1}{2(\tau+\tau_c)^2} < 0, \quad (34)$$

the maximum value of $f_{sc}(t)$ is a monotonically decreasing function of $\tau_c$ over the permissible range of the latter parameter. Consequently, if $\tau_c$ approaches 0, the maximum value of $f_{sc}(t)$ increases asymptotically toward $$\lim_{\tau_c \to 0}[f_{sc}(t)]_{\max} = \frac{m+2}{2m\tau} = \frac{m+2}{2}[f_{if}(t)]_{ss} \quad (35)$$

Relations (33) through (35) also apply to $f_{ic}(t)$, the frequency of $X_i(t)$ in the coarse-resolution mode when $X_i(t)$, $X_{dl}(t)$, and $X_{ul}(t)$ are transmitted to the associated servomechanism instead of $X_s(t)$. However, although $f_{sc}(t)$ must remain non-negative as shown by Relation (32), the range of $f_{ic}(t)$ includes negative values, a novel feature of the dual-resolution signal converter.

If transmission of $X_{dl}(t)$ and $X_{ul}(t)$ to the associated servomechanism is precluded, comparison of Relations (26) and (33) shows the maximum frequency of $X_s(t)$ to be greater than the maximum frequency of $X_i(t)$ by a factor $K_{si}$, where $$K_{si} = \frac{[f_{sc}(t)]_{\max}}{[f_{if}(t)]_{\max}} = \frac{(m+2)\tau+2\tau_c}{3\tau+2\tau_c} \quad (36)$$

Because $$\frac{\delta}{\delta\tau_c}K_{si} = \frac{-2\tau(m-1)}{(3\tau+2\tau_c)^2} < 0, \quad (37)$$

$K_{si}$ is a monotonically decreasing function of $\tau_c$ over the permissible range of the latter parameter. Consequently, if $\tau_c$ approaches 0, $K_{si}$ increases asymptotically toward the value $$\lim_{\tau_c \to 0} K_{si} = \frac{m+2}{3} \quad (38)$$

If $m=128$ as in the present embodiment of the dual-resolution signal converter, 40 is a typical value of the factor $K_{si}$ in practice.

As shown in FIG. 7, the output synthesizer consists of a state memory, 143, a cycle injector, 144, a transition detector, 145, and an interval detector, 146. State memory 143 receives the input carrier $X_i(t)$ from carrier generator 6 and the output $X_e(t)$ of interval detector 146 as inputs and generates the outputs $\overline{X_i}(t)$, $X_m(t)$, and $\overline{X}_m(t)$. Cycle injector 144 receives the output signals $X_m(t)$ and $\overline{X}_m(t)$ of state memory 143 together with the cyclic-injection signal $X_{ul}(t)$ from cyclic-command injector 8 and generates the synthesizer carrier $X_s(t)$. Transition detector 145 also receives the input-position carrier $X_i(t)$ from input-command carrier generator 6 together with its complement $\overline{X_i}(t)$ derived from state memory 143 and generates the output $X_\delta(t)$. Interval detector 146 receives the signal $X_\delta(t)$ from transition detector 145 along with the remaining cyclic-injection signal $X_{dl}(t)$. The phase-modulated logical carrier output of the output synthesizer, $X_s(t)$, is derived from the output of cycle injector 144.

In the fine-resolution mode, the output $X_m(t)$ of state memory 143 is essentially the same as $X_i(t)$. The signal $X_m(t)$ is then transmitted without modification by cycle injector 144 to yield a unified synthesizer output $X_s(t)$ also essentially identical to $X_i(t)$. In the coarse-resolution mode, however, $X_s(t)$ is no longer identical to $X_i(t)$. Rather, the phase of $X_s(t)$ is then advanced or retarded by $2\pi$ in response to each selected $C_2(t)$ pulse applied at $X_{ul}(t)$ or $X_{dl}(t)$, respectively.

State memory 143 consists of a pair of AND gates, 1431 and 1432, a flip-flop, 1433, and an inverter, 1434. The input-position carrier $X_i(t)$ is applied as a first input to AND gate 1431 and to inverter 1434. Inverter 1434 then transmits the resultant complement $\overline{X_i}(t)$ as a first input to AND gate 1432 and as an output of state memory 143. The second input to each of the AND gates 1431 and 1432 is the enabling signal $X_e(t)$ generated by interval detector 146. The output of AND gate 1431 is connected to the override-set input terminal of flip-flop 1433, and the output of AND gate 1432 is connected to the override-reset input terminal of flip-flop 1433. Inputs of fixed logical value 0 are applied to the J, K, and T terminals of flip-flop 1433. The signal $X_m(t)$ and its complement $\overline{X}_m(t)$, both outputs of state memory 143, are derived from the 1 and 0 terminals, respectively, of flip-flop 1433.

The purposes of state memory 143 are to transmit the input-position carrier $X_i(t)$ instantaneously to the output $X_m(t)$ when the enabling signal from interval detector 146 has the value $X_e(t)=1$ and to prevent variation of $X_m(t)$ when $X_e(t)=0$. The first result is obtained by transmitting $X_i(t)$ to the override-set input of flip-flop 1433 via AND gate 1431 and by transmitting the complement of $X_i(t)$ to the override-reset input terminal of flip-flop 1433 via AND gate 1432 when both AND gates are enabled by the signal $X_e(t)=1$. Consequently, the normal output of flip-flop 1433, $X_m(t)$, then follows $X_i(t)$. When $X_e(t)=0$, however, variation of $X_m(t)$ is suspended by inhibiting both AND gates 1431 and 1432 until $X_e(t)$ assumes the true state both in the coarse-resolution mode when the relative phase of the unified synthesizer carrier $X_s(t)$ is being advanced and in either resolution mode when no pulses of $\Delta\theta_i^+(t)$, $Y_a(t)$, $\Delta\theta_i^-(t)$, or $Y_r(t)$ are being transmitted.

Cycle injector 144 consists of a pair of AND gates, 1441 and 1442, an OR gate, 1443, and an inverted, 1444. The normal output $X_m(t)$ of state memory 143 is applied as a first input to AND gate 1441, and the complement output $\overline{X}_m(t)$ of state memory 143 is applied as a first input to AND gate 1442. The cyclic-injection signal $X_{ul}(t)$ is applied to AND gate 1442 as the second input and to inverter 1444. Inverter 1444 then transmits the resultant complement $\overline{X_{ul}}(t)$ as the second input to AND gate 1441. The outputs of AND gates 1441 and 1442 are the two respective inputs of OR gate 1443. The output of OR gate 1443 constitutes the unified carrier output $X_s(t)$ of cycle injector 144.

The purpose of cycle injector 144 is to advance the phase of $X_m(t)$ by $2\pi$ each time $X_{ul}(t)$ transmits a $C_2(t)$ pulse. This result is achieved by causing $X_s(t)$ to equal $X_m(t)$ when $X_{ul}(t)$ is false and to equal $\overline{X}_m(t)$ when $X_{ul}(t)$ is true so that $$X_s(t) = \begin{cases} X_m(t), & X_{ul}(t) = 0, \quad (39a) \\ \overline{X}_m(t), & X_{ul}(t) = 1. \quad (39b) \end{cases}$$

Each $X_{ul}(t)$ pulse causes one additional 0-to-1 and 1-to-0 transition to occur in $X_s(t)$, thereby advancing the phase of $X_s(t)$ by $2\pi$. The order in which these additional transitions of $X_s(t)$ occur is determined by the state of $X_m(t)$ at the time an $X_{ul}(t)$ pulse occurs. The signals $X_{m'}(t)$ and $X_{ul}(t)$ are so timed that interference between their transitions cannot occur and thereby lead to an incorrect number of transitions of $X_s(t)$. Each transition of $X_m(t)$ corresponds approximately with the trailing edge of a $C_1(t)$ pulse, and $X_{ul}(t)$ consists of selected $C_2(t)$ pulses. Because transitions of $C_1(t)$ and $C_2(t)$ never occur simultaneously, transitions of $X_m(t)$ and $X_{ul}(t)$ cannot occur simultaneously either.

Transition detector 145 consists of a flip-flop, 1451, a pair of AND gates, 1452 and 1453, and an OR gate, 1454. Input-position carrier $X_i(t)$ is applied to the J input terminal of flip-flop 1451 and as a first input to AND gate 1452. The complement $\overline{X}_i(t)$ of the input-position carrier is derived from inverter 1434 in state memory 1433 and applied both to the K input terminal of flip-flop 1451 and as a first input to AND gate 1453. In addition, primary clock-pulse train $C_1(t)$ is applied to the T input terminal of flip-flop 1451. The 1 output terminal of flip-flop 1451 is connected to the second input terminal of AND gate 1453. The outputs of AND gates 1452 and 1453 are the only inputs of OR gate 1454. At its output OR gate 1454 generates the signal $X_\delta(t)$, which constitutes the sole output of transition detector 145.

The purpose of transition detector 145 is to produce a normally true output signal $X_\delta(t)$ in which a false pulse starts with each transition of $X_i(t)$ and terminates with the trailing edge of the next $C_1(t)$ pulse. This result is achieved by shifting the state of $X_i(t)$ to flip-flop 1451 each time a 1-to-0 transition of $C_1(t)$ occurs. The three gates 1452, 1453, and 1454 are connected to produce a signal $X_\delta(t) = 0$ only when $X_i(t)$ and the state of flip-flop 1451 are complementary.

Interval detector 146 consists of a pair of flip-flops, 1461 and 1462, and an AND gate, 1463. Cyclic-injection signal $X_{dl}(t)$ from cyclic-command injector 8 is applied to the override-reset input terminals of flip-flops 1461 and 1462. The output $X_\delta(t)$ of transition detector 145 is applied to the T input terminals of flip-flops 1461 and 1462. Signals of fixed logical values 1 and 0 are applied to the J and K input terminals, respectively, of flip-flop 1461. The 1 output terminal of flip-flop 1461 is connected to the J input terminal of flip-flop 1462 and to a first input of AND gate 1463. In addition, the 0 output terminal of flip-flop 1461 is connected to the K input terminal of flip-flop 1462. The 1 output terminal of flip-flop 1462 is connected to a second input of AND gate 1463. At its output AND gate 1463 generates the enabling signal $X_e(t)$, which constitutes the sole output of interval detector 146.

The purpose of interval detector 146 is to produce a normally true output signal $X_e(t)$ which goes false whenever a selected $C_2(t)$ pulse transmitted by $X_{dl}(t)$ goes true and which remains false until the second succeeding 1-to-0 transition of $X_\delta(t)$. Because $X_\delta(t)$ responds identically to transitions of $X_i(t)$ of either polarity, this 1-to-0 transition of $X_\delta(t)$ coincides with the second succeeding transition of $X_i(t)$, except for a small delay. As previously explained, state memory 143 prevents transition of $X_m(t)$ whenever interval detector 146 is generating the output $X_e(t) = 0$. Therefore, exactly two transitions of $X_i(t)$ are omitted from $X_m(t)$ and, consequently, from $X_s(t)$ whenever an $S_{dl}(t)$ pulse drives $X_e(t)$ false. In this manner, the phase of $X_s(t)$ is retarded by $2\pi$ in response to each $X_{dl}(t)$ pulse applied to interval detector 146.

The interval-detector output $X_e(t)$ generated by AND gate 1463 is true only when the states of flip-flops 1461 and 1462 are simultaneously true. Such a steady-state condition exists as long as $X_{dl}(t) = 0$. However, application of an $X_{dl}(t)$ pulse to the override-reset inputs of flip-flops 1461 and 1462 causes the state of each of these flip-flops to become false, thereby resulting in the condition $X_e(t) = 0$. The next 1-to-0 transition of $X_\delta(t)$ then causes flip-flop 1461 to return to the true state, and the succeeding 1-to-0 transition of $X_\delta(t)$ causes flip-flop 1462 to do likewise. As soon as flip-flops 1461 and 1462 are both true again, $X_e(t)$ returns to the true state.

Figure 8:
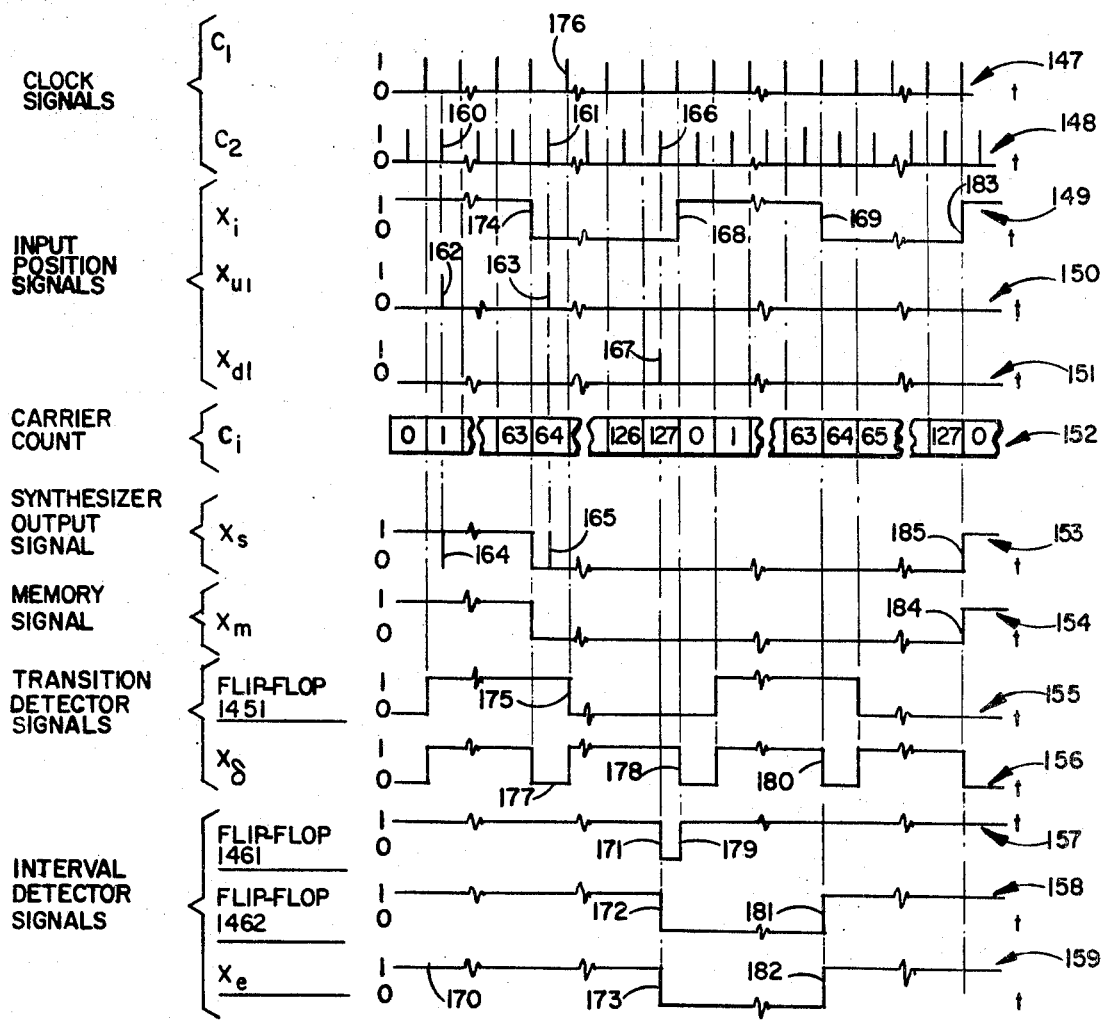
FIG. 8 shows a series of waveforms useful in explaining the operation of the output synthesizer.

Logical waveforms relating to the output synthesizer are shown in FIG. 8. There each jagged discontinuity indicates a lapse of time for an integral multiple of the clock period $\tau$ while the states of all signals except the clock trains remain fixed. Throughout FIG. 8, the dual-resolution signal converter is in the coarse-resolution mode.

The clock trains $C_1(t)$ and $C_2(t)$ which synchronize the output synthesizer are shown in waveforms 147 and 148. Other inputs to the synthesizer are the input-position carrier $X_i(t)$ shown in waveform 149, the cyclic-advance signal $X_{ul}(t)$ shown in waveform 150, and the cyclic-retard signal $X_{dl}(t)$ shown in waveform 151. Because the dual-resolution signal converter is in the coarse-resolution mode, the period of $X_i(t)$ remains constant at $m\tau$, where $m = 128$ for the case shown. The corresponding input-carrier count $C_i(t)$ appears at 152.

The synthesizer output $X_s(t)$ is shown in waveform 153. FIG. 8 illustrates the manner in which the relative phase of $X_s(t)$ is advanced by increments of $2\pi$ in the coarse-resolution mode. The carrier $X_s(t)$ is essentially identical to $X_i(t)$ as long as $X_{ul}(t) = X_{dl}(t) = 0$. In the coarse-resolution mode, however, each $X_{ul}(t)$ pulse causes an additional pair of transitions, a 0-to-1 transition and a 1-to-0 transition, to appear in $X_s(t)$ in an order which promptly advances the relative phase of $X_s(t)$ by $2\pi$. Thus, in response to the $C_2(t)$ pulses at 160 and 161 transmitted by $X_{ul}(t)$ at 162 and 163, respectively, $X_s(t)$ becomes the complement of $X_i(t)$, as shown at 164 and 165, whenever $X_{ul}(t) = 1$. In this manner, each $X_{ul}(t)$ pulse, such as that at 162 or 163, causes two logical transitions to appear in $X_s(t)$ which are not found in $X_i(t)$.

To understand why the output synthesizer responds to each $X_{ul}(t)$ pulse as just described in the coarse-resolution mode, the only additional signal which must be examined is the memory signal $X_m(t)$ at 154. This signal is essentially identical to $X_i(t)$ as long as $X_{dl}(t) = 0$. Cycle injector 144 is designed to generate an output $X_s(t)$ which is identical to $X_{m'}(t)$ when $X_{ul}(t) = 0$ and which is the complement of $X_m(t)$ when $X_{ul}(t) = 1$. These facts alone are sufficient to account for the waveform of $X_s(t)$ at 153 in FIG. 8 before $X_{dl}(t)$ pulse at 167 occurs.

FIG. 8 also illustrates the manner in which the relative phase of $X_s(t)$ is retarded by increments of $2\pi$ in the coarse-resolution mode. Response is initiated by the transmission of the $C_2(t)$ pulse at 166 by $X_{dl}(t)$ at 167. Such an $X_{dl}(t)$ pulse inhibits transmission to $X_s(t)$ of the succeeding two transitions of $X_i(t)$ at 168 and 169. Thus, $X_s(t)$ remains constant during and between these transitions.

The manner in which the phase of $X_s(t)$ is retarded in the coarse-resolution mode can be better understood by examining the state-memory signal $X_m(t)$ shown in waveform 154, the transition-detector signals shown in waveforms 155 and 156, and the interval-detector signals shown in waveforms 157 through 159. For $X_e(t)$ in waveform 159 to be true, both flip-flops 1461 and 1462, whose states are shown in waveforms 157 and 158, must be true simultaneously. Whenever $X_e(t)=1$ as shown at 170, $X_m(t)$ assumes the same state as $X_i(t)$. When $X_e(t)=0$, however, no variation of $X_m(t)$ can occur. The signal $X_e(t)$ is driven false immediately by each $X_{d1}(t)$ pulse, because such a pulse causes flip-flops 1461 and 1462 both to go false. Thus, the $X_{d1}(t)$ pulse at 167 cause flip-flops 1461 and 1462, as well as $X_e(t)$, to go false as shown at 171, 172, and 173 in waveforms 157 through 159, respectively. As waveform 154 shows, $X_m(t)$ does not vary as long as $X_e(t)$ remains false.

Once $X_e(t)$ is false, it turns to the true state again in response to the transition signal $X_\delta(t)$ shown in waveform 156. The normally true signal $X_\delta(t)$ goes false only when the states of $X_i(t)$ and flip-flop 1451, shown by waveforms 149 and 155, are different. However, each time $X_i(t)$ changes to a new state, flip-flop 1451 assumes this same state in response to the trailing edge of the next $C_1(t)$ pulse. For example, when $X_i(t)$ goes false at 174, flip-flop 1451 goes false at 175 in response to the $C_1(t)$ pulse at 176. Thus, in response to the 1-to-0 transition of $X_i(t)$ at 174, a false pulse is generated at 177 which lasts until flip-flop 1451 can go false at 175.

If flip-flops 1461 and 1462 are both false, every 1-to-0 transition of $X_\delta(t)$ returns each flip-flop successively to the true state. Thus, when flip-flops 1461 and 1462 both go false at 171 and 172, the next 1-to-0 transition of $X_\delta(t)$, that at 178, causes flip-flop 1461 to again go true at 179. Similarly, the succeeding 1-to-0 transition of $X_\delta(t)$, at 180, causes flip-flop 1462 to return to the true state at 181. Because both flip-flops 1461 and 1462 are now true again, $X_e(t)$ also returns to the true state at 182. Thus, only two 1-to-0 transitions of $X_\delta(t)$ are required to return $X_e(t)$ to the true state. With $X_e(t)$ again true, each transition of $X_i(t)$, such as that at 183, is again transmitted to $X_m(t)$ and thence to $X_s(t)$ as shown at 184 and 185, respectively. During the interval when $X_e(t)=0$ from 173 to 182, the transitions of $X_i(t)$ at 168 and 169 are not accompanied by transitions of either $X_m(t)$ in waveform 154 or $X_s(t)$ in waveform 153.

As an example of an application of the output synthesizer, its straightforward utilization with the dual-resolution signal converter to transform incremental position commands from a digital computer into a phase-modulated carrier for application to a phase-comparison positioning servomechanism will be described. All connections are similar to those shown in FIG. 2 except for the outputs $X_{u1}(t)$, $X_i(t)$, and $X_{d1}(t)$ of the dual-resolution signal converter. In the present case, these outputs are connected only to the output synthesizer and not to positioning servomechanism 12. The synthesizer output, $X_s(t)$, is then connected to the input of phase comparator 16 which was formerly connected to $X_i(t)$. With the output synthesizer in operation, $X_s(t)$ is the only signal directed from either the dual-resolution signal converter or the synthesizer to the servomechanism, thereby making OR gates 19 and 20 in FIG. 2 unnecessary. Consequently, the signal $X_{u2}(t)$ can now be connected directly to the former output line of OR gate 19, and the signal $X_{d2}(t)$ can be connected directly to the former output line of OR gate gate 20. Any provision within the servomechanism to accommodate separate fine-resolution and coarse-resolution input signals is thus unnecessary.

It is, therefore, seen that in accordance with the present invention there is provided a dual-resolution signal converter which is operative to provide variable resolution in the transmission link between the incremental position output of a digital computer and the position input of a positioning servomechanism of the phase-comparison type. With the apparatus of the present invention, two widely different position-command resolutions are available. As a result, it is possible for the computer to command extensive variation of the servomechanism output in large steps while still retaining the ability to command final positioning or scanning motion in small steps. The necessity for a compromise between servomechanism resolution and speed or between computer modification for a higher output-pulse rate and servomechanism performance is eliminated.

While the invention has been described with respect to several physical embodiments constructed in accordance therewith, it will be apparent to those skilled in the art that various modifications and improvements may be made without departing from the scope and spirit of the invention. For example, modification could be made of the error-phase decoder 15 in phase-comparison positioning servomechanism 12 to further increase the weight of each pulse emitted from the dual-resolution signal converter without reducing the maximum pulse rate permissible at $\Delta\theta_i{}^+(t)$ and $\Delta\theta_i{}^-(t)$. In this manner, the maximum slewing rate can be increased by more than an order of magnitude over that possible by means already described. This result can be obtained by injecting $X_{u1}(t)$ and $X_{d1}(t)$ into the reversible error counter in a manner different from that shown in FIG. 2. More specifically, in FIG. 2 each $X_{u1}(t)$ and $X_{d1}(t)$ pulse applied to the reversible error counter increases or decreases the count stored therein by one. However, the reversible error counter 17 may be modified by addition of a plurality of OR gates between stages so that $X_{u1}(t)$ and $X_{d1}(t)$ can be applied to any stage within counter 17 without disturbing the normal operation of the counter. For example, when a straight-binary reversible error counter is employed at 17 and the coarse-resolution inputs $X_{u1}(t)$ and $X_{d1}(t)$ are applied to the first stage, the count is increased or decreased by one in response to each pulse of these respective signals, as previously described. However, if $X_{u1}(t)$ and $X_{d1}(t)$ are applied to the second stage of reversible counter 17 instead, the count is then increased or decreased by two in response to each pulse of these respective signals. More generally, if $X_{u1}(t)$ and $X_{d1}(t)$ are applied to the $j$th stage of reversible counter 17, where $j$ is a positive integer, the count is increased or decreased by $2^{j-1}$ in response to each pulse of $X_{u1}(t)$ or $X_{d1}(t)$, respectively. Therefore, by merely using a combination of switches and gates, the coarse-resolution inputs can be applied to any stage within reversible error counter 17 to vary the weight of each pulse emitted from the dual-resolution signal converter without reducing the maximum pulse rate permissible at $\Delta\theta_i{}^+(t)$ and $\Delta\theta_i{}^-(t)$.

Still further modifications and improvements will become apparent to those skilled in the art without departing from the scope and spirit of the present invention. Accordingly, it is to be understood that the invention is not to be limited by the specific illustrative embodiments but only by the scope of the appended claims.

I claim:

1. A system for providing signals for application to a phase sensitive device comprising:
 (a) means for generating a first and a second train of constant periodic signals;
 (b) signal input means for providing prase advance or phase retard signals;
 (c) phase modulator means for receiving said first and said second periodic signals and modulating said first signal in response to said provided phase advance or phase retard signal such that portions of said second signal are added to said first signal or portions of said first signal are removed from said first signal;
 (d) counter means for counting the period of the modulated signal from said phase modulator means, and for providing an output at each preselected number of counted periods;
 (e) injector means receiving as inputs said second train of periodic signals, and said phase advance or phase retard signals, said injector means having a first output channel and a second output channel anl operative such that said second periodic signal appears on said first channel upon receipt of a phase advance signal and on said second channel upon receipt of a phase retard signal; and (f) resolution control means having a coarse and a fine-resolution mode connected to said phase modulator means and said injector means so as to inhibit the output from said injector means in said fine-resolution mode and for inhibiting the output from said phase modulator means in said coarse-resolution mode.

2. The invention according to claim 1 wherein said counter means is comprised of:

a $q$ stage counter having $m=2^q$ states for counting the periods in said modulated periodic signal, deriving the counter output signal from the most significant stage of said counter so that a full cycle of said output signal occurs for every $m$ periods of said modulated periodic signal.

3. The invention according to claim 2 wherein said phase modulator means is operative to selectively add a single period to said first periodic signal or to subtract a single period from said first periodic signal whereby each single period added or subtracted is operative to advance or retard the phase of said counter output signal by $2\pi/m$.

4. The invention according to claim 1 and further comprising:

(a) phase compare means having a first and a second output channel connected to receive the output of said counter means and compare the output signal of said counter means with signal to provide an output signal on said first channel when the phase of said output signal is greater than said reference signal, and to provide an output signal on said second channel when the phase of said output channel is less than the phase of said output signal; and (b) reversible counter means for receiving the signals on the first and second channels of said phase compare means and the signals on the first anl second channels of said injector means, said counter means operative to increase the count stored therein by a predetermined amount upon the receipt of a signal on either of said first channels and to decrease the count stored therein by a predetermined amount upon the receipt of a signal on either of said second channels and to provide an output indicative of said count.

5. A system for providing variable resolution in the transmission link between a command source and a phase sensitive device comprising:

(a) two phase clock means for generating two pulse trains of equal rate, the phase of said pulse trains being displaced a predetermined fixed amount from each other;

(b) phase modulator means having as inputs two incremental digital signals, one a phase-advance input and the other a phase-retard input, and also connected to receive as inputs the two pulse trains of said clock means, said phase modulator means operative to emit at its output, pulses from the first of said two pulse trains in the absence of said input incremental digital signals, and for each of said phase-advanced pulses applied to said input to add one pulse from the second of said two pulse trains to said first pulse train and for each phase-retard pulse applied to said input to remove one pulse from said first pulse train;

(c) counter means for counting the pulses emitted from said phase modulator means and for providing an output pulse at each preselected number of counted pulses;

(d) injector means receiving as inputs said second pulse train of equal rate and said two incremental digital signals, said injector means comprising a first output channel and a second output channel, and means responsive to said first incremental digital signal for directing said second pulse train to said first channel and responsive to said second incremental digital signal to direct said second pulse train to said second channel;

(e) resolution control means having a coarse and a fine-resolution mode connected to said phase modulator means and said injector means so as to inhibit the output from said injector means in said fine-resolution mode and for inhibiting the output from said phase modulator means in said coarse-resolutions mode;

(f) phase compare means having a first and a second output channel, said means responsive to the output pulses from said counter means to provide an output on said first channel when the output pulses from said counters are advanced in phase from a reference phase and for providing an output on said second channel when the output pulses from said counter are retarded in phase from said reference phase; and (g) reversible counter means for receiving the signals on the first and the second channels of said phase compare means and said injector means, said reversible counter means operative to increase the count stored therein by a predetermined amount upon the receipt of a signal on either of said first channels and to decrease the count stored therein by a predetermined amount upon the receipt of a signal on either of said second channels and to provide an output to the phase sensitive device indicative of said count.

6. The invention according to claim 5 wherein said counter means is comprised of:

a $q$ stage counter having $m=2^q$ states for counting the pulses emitted from said first modulator means, deriving the counter output signal from the most significant stage of said counter so that a full cycle of said output signal occurs for every $m$ periods of said counted pulses.

7. The invention according to claim 5 wherein said phase modulator means is operative to selectively add a single pulse to said first pulse train signal or to subtract said pulse from said first train signal whereby each pulse added or subtracted is operative to advance or retard the phase of the counter means output signal by $2\pi/m$.

References Cited

UNITED STATES PATENTS

| | | | |
|---|---|---|---|
| 3,364,439 | 1/1968 | Cohen et al. | 328—155X |
| 3,465,264 | 9/1969 | Stone | 328—155X |
| 3,316,503 | 4/1967 | Lenz | 332—16 |

JOHN S. HEYMAN, Primary Examiner

U.S. Cl. X.R.

328—44, 133; 332—16